US012759918B2

(12) United States Patent
Small

(10) Patent No.: US 12,759,918 B2
(45) Date of Patent: Oct. 13, 2026

(54) DISASTER RELIEF DEVICE

(71) Applicant: Dustin Small, Orlando, FL (US)

(72) Inventor: Dustin Small, Orlando, FL (US)

(*) Notice: Subject to any disclaimer, the term of this patent is extended or adjusted under 35 U.S.C. 154(b) by 0 days.

(21) Appl. No.: 19/324,282

(22) Filed: Sep. 10, 2025

(65) Prior Publication Data

US 2026/0116802 A1 Apr. 30, 2026

Related U.S. Application Data

(60) Provisional application No. 63/714,500, filed on Oct. 31, 2024.

(51) Int. Cl.
*C02F 9/20* (2023.01)
*B01D 61/10* (2006.01)
(Continued)

(52) U.S. Cl.
CPC ................ *C02F 9/20* (2023.01); *C02F 1/002* (2013.01); *H01M 4/5825* (2013.01); *H01M 10/613* (2015.04); *H01M 10/623* (2015.04); *H01M 10/63* (2015.04); *H01M 50/24* (2021.01); *H01M 50/247* (2021.01); *B01D 61/10* (2013.01); *C02F 1/32* (2013.01); *C02F 1/441* (2013.01); *C02F 2103/001* (2013.01); *C02F 2201/005* (2013.01);
(Continued)

(58) Field of Classification Search
CPC .... C02F 9/10; C02F 1/002; C02F 1/32; C02F 1/441; C02F 2103/001; C02F 2201/005; C02F 2201/009; C02F 2209/008; C02F 2303/04; B01D 61/10; E03B 3/02; E03B 3/04
See application file for complete search history.

(56) References Cited

U.S. PATENT DOCUMENTS 6,182,453 B1 2/2001 Forsberg
6,436,283 B1 * 8/2002 Duke ........................ E03B 3/02
210/748.11
(Continued)

FOREIGN PATENT DOCUMENTS

MX 2012012431 A 4/2014
WO 2015106233 A1 7/2015

*Primary Examiner* — Liam Royce
(74) *Attorney, Agent, or Firm* — ALLEN, DYER, DOPPELT + GILCHRIST, P.A.

(57) ABSTRACT

A disaster relief device is provided that integrates power generation, water purification, and communications into a single portable housing. The device includes a water treatment system having reusable pre-filters, multi-stage sediment filters, a reverse osmosis unit, and a UV sterilizer, together with a clean water storage tank mounted on a drawer for field servicing. An electrical subsystem incorporates a lithium iron phosphate battery pack in a fire-resistant enclosure, a charge controller, and a pure sine wave inverter. A hybrid solar array, including hinged and slide-out panels, provides rapid renewable power deployment, with guided cable carriers ensuring reliability. The housing is sealed to an IP66 rating, reinforced to function as a Faraday cage, and configured for transport with folding handles and airless wheels. Optional features include an integrated rainwater harvesting system, modular interconnection of multiple units for scaling capacity, and a satellite communications bracket for emergency connectivity.

15 Claims, 21 Drawing Sheets

(51) Int. Cl.

| | |
|---|---|
| ***C02F 1/00*** | (2023.01) |
| ***C02F 1/32*** | (2023.01) |
| ***C02F 1/44*** | (2023.01) |
| ***C02F 103/00*** | (2006.01) |
| ***E03B 3/02*** | (2006.01) |
| ***E03B 3/04*** | (2006.01) |
| ***H01M 4/58*** | (2010.01) |
| ***H01M 10/613*** | (2014.01) |
| ***H01M 10/623*** | (2014.01) |
| ***H01M 10/63*** | (2014.01) |
| ***H01M 50/24*** | (2021.01) |
| ***H01M 50/247*** | (2021.01) |

(52) U.S. Cl.

CPC .. *C02F 2201/009* (2013.01); *C02F 2209/008* (2013.01); *C02F 2303/04* (2013.01); *E03B 3/02* (2013.01); *E03B 3/04* (2013.01); *H01M 2220/30* (2013.01)

(56) References Cited

U.S. PATENT DOCUMENTS

| | | | | |
|---|---|---|---|---|
| 6,804,962 | B1 * | 10/2004 | Prueitt | B01D 61/10<br>60/671 |
| 6,863,827 | B2 | 3/2005 | Saraceno | |
| D575,843 | S | 8/2008 | Werner | |
| 10,294,686 | B1 * | 5/2019 | Erlich | B63H 11/107 |
| 10,464,822 | B1 * | 11/2019 | Webb | C02F 9/20 |
| 11,274,048 | B2 | 3/2022 | Maughan | |
| 11,608,277 | B1 * | 3/2023 | Sawicki | E03B 3/04 |
| 2004/0108280 | A1 | 6/2004 | Saraceno | |
| 2006/0260672 | A1 | 11/2006 | Niederer | |
| 2010/0109601 | A1 | 5/2010 | Coyle et al. | |
| 2011/0084023 | A1 | 4/2011 | Liao | |
| 2012/0181235 | A1 | 7/2012 | Leonard | |
| 2013/0098816 | A1 | 4/2013 | Elfstrom | |
| 2019/0070557 | A1 | 3/2019 | Morrison | |
| 2019/0326846 | A1 * | 10/2019 | Ansari | C02F 1/006 |
| 2020/0216332 | A1 * | 7/2020 | Li | C02F 1/001 |
| 2022/0280898 | A1 | 9/2022 | Adams et al. | |
| 2023/0083946 | A1 | 3/2023 | Favorel | |

* cited by examiner

DISASTER RELIEF DEVICE

RELATED APPLICATIONS

This application claims the benefit of U.S. Provisional Application Ser. No. 63/714,500 filed Oct. 31, 2024, which is hereby incorporated herein in its entirety by reference.

FIELD OF THE INVENTION

The present invention relates to the field of natural and manmade disasters, and more particularly to a disaster relief device.

BACKGROUND

Disaster relief devices encompass tools, equipment, and technologies designed to support emergency response, recovery, and humanitarian aid efforts in the aftermath of disasters. These disasters may include natural events such as earthquakes, floods, and hurricanes, as well as manmade incidents such as industrial accidents, infrastructure failures, or armed conflict. Effective disaster relief devices are essential for delivering critical resources such as potable water, electricity, shelter, and medical supplies. These systems also often support communication and coordination between responders and affected populations.

While there has been progress in the development of emergency infrastructure solutions, existing water purification and power generation systems are often built into or deployed using large shipping containers, trailers, or other heavy and bulky platforms. These containerized systems, although robust, are frequently not suitable for rapid deployment via air transport due to their size, weight, and handling requirements. As a result, such systems must typically be transported by sea or overland routes, causing delays in deployment and reducing their effectiveness in the critical early hours or days following a disaster.

The inability to airlift water and power systems to remote or isolated disaster zones-especially when road access is blocked or seaports are damaged-represents a significant limitation in current relief operations. Accordingly, there is a need in the art for improved disaster relief devices that are compact, lightweight, and modular, enabling rapid air transport and immediate setup in austere, high-risk environments.

SUMMARY

The present invention relates to a disaster relief device that integrates power generation, water purification, and communications capabilities into a single portable housing. Unlike conventional systems that separately provide water treatment or portable solar power, the invention combines these essential survival functions into a ruggedized, rapidly deployable unit suitable for use in austere or disaster-stricken environments.

In a particular aspect, the disaster relief device comprises a main housing containing both a water filtration system and an electrical power system. The water filtration system includes a reusable pre-filter, multiple sediment filters, a reverse osmosis stage, and a UV sterilization stage. Treated water is stored in a clean water tank mounted on a drawer assembly, enabling convenient servicing and cleaning in the field. The electrical power system includes a lithium iron phosphate battery pack enclosed within a fire-resistant and thermally controlled compartment, a charge controller, and a pure sine wave inverter for powering external devices.

A hybrid solar panel assembly is mounted to the housing and incorporates a hinged upper panel together with slide-out side panels, enabling compact transport and rapid expansion into a full solar array. Cable carriers guide and protect wiring during deployment and retraction. The housing is sealed to at least an IP66 rating and fabricated from conductive materials to provide electromagnetic shielding, thereby functioning as a Faraday cage to protect the electronic subsystems from electromagnetic pulses or other directed energy events.

In another particular aspect, the device further incorporates a rainwater collection system formed from composite fabric stretched over outrigger poles with wind relief flaps and a funnel directing rain into the dirty water tank. The unit may also support an integrated communications bracket configured to mount a satellite antenna, thereby enabling low-orbit satellite connectivity in the field.

The device is configured for autonomous and unattended operation. An electronic float switch and wastewater recirculation valve enable intelligent water management, including recirculating reverse osmosis brine into the dirty tank under conditions of scarcity. The modular architecture further allows multiple units to be interconnected to share electrical loads and water supply, thereby scaling capacity for larger communities.

A method of providing emergency relief is also disclosed, including transporting the device to a deployment site, deploying the solar array, regulating charge to the battery pack, powering external devices through the inverter, introducing contaminated water into the dirty water tank, filtering the water through the purification stages, and dispensing potable water into a storage container. The method may further include passively collecting rainwater, selectively recirculating wastewater, and powering communications equipment through the integrated satellite bracket.

Through this combination of features, the invention provides a compact, rugged, and scalable disaster relief solution. It addresses shortcomings in the prior art by eliminating the need for multiple separate systems, offering a deployable device that autonomously produces clean water, reliable power, and communications in environments where infrastructure has failed.

DETAILED DESCRIPTION

Figure 1:
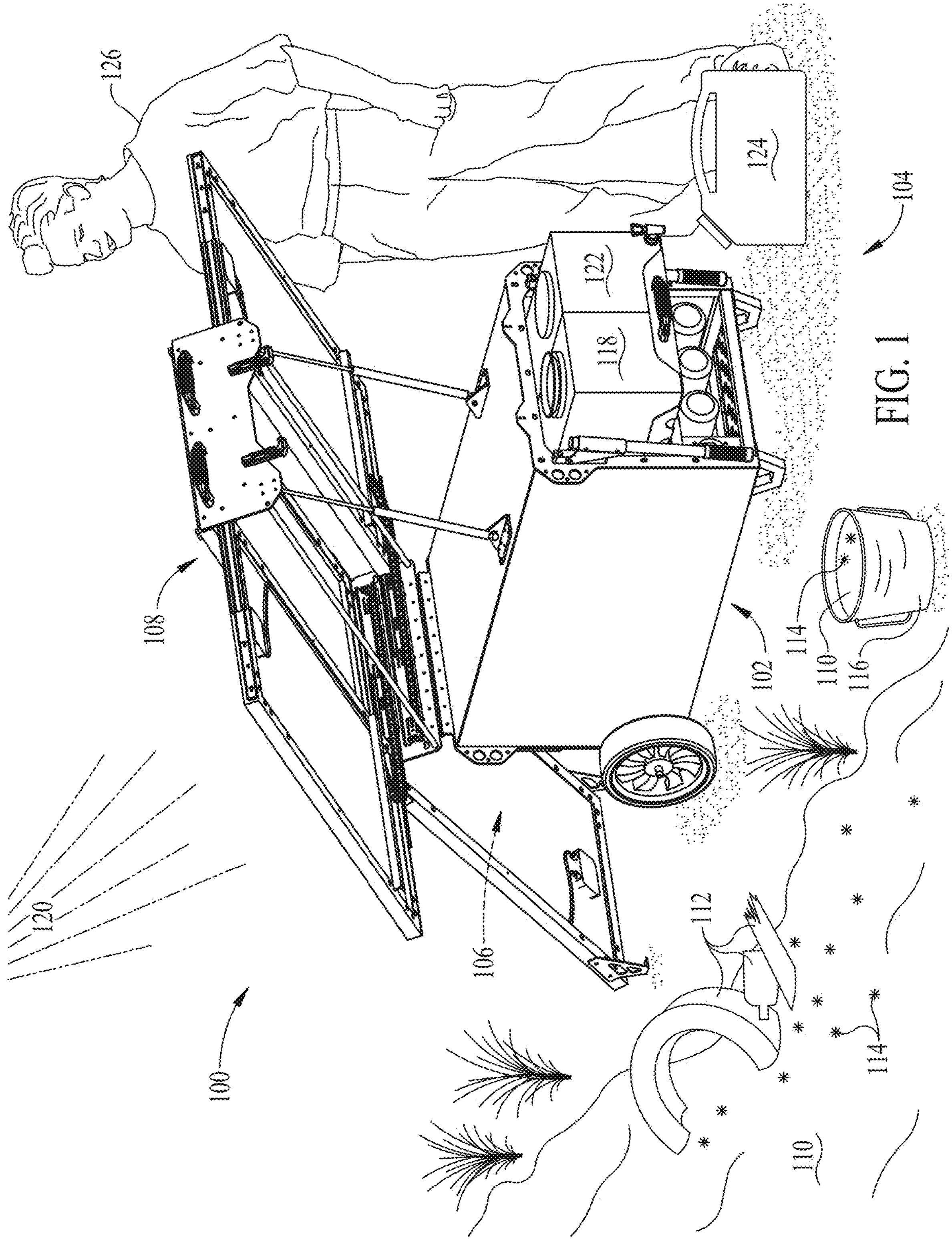
FIG. 1 is a front perspective view of a disaster relief device (DRD) in which various aspects of the disclosure may be implemented.

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

The invention is a disaster relief device (DRD) that is compact, mobile, and fabricated to aerospace grade specifications. This lifesaving disaster relief device is configured for use in harsh environments and to provide the basic support of life, clean water, and power. The DRD supports disaster relief zones via two simple characteristics, power and clean water. In particular, the DRD is designed/fabricated in a way to be permanently deployed outdoors while maintaining full operational control of all electronics and water filtration systems in harsh environments/conditions.

Disaster relief zones may vary from a warzone, hurricane disaster zone, earthquake zone, sub-Sahara toxic rivers, power outages, environmental disasters such as oil spills, toxic chemicals, toxicity and power outages from massive fires. Some specific examples of disasters where the DRD could have made a significant impact are the Norfolk Southern train derailment near east Palestine, Ohio, releasing 1.1 million pounds of liquid vinyl chloride and other chemicals into the environment. These chemicals leached into the nearby rivers, streams and waterways traveling for miles, contaminating the entire area killing hundreds of animals and making nearby residents very ill. Another specific example is the tragic events in western North Carolina due to the powerful flooding from Hurricane Helene. Emergency equipment, critical supplies as well as first responders could not access the disaster victims in a timely manner due to severe roadway erosion, terrain challenges and mudslides blocking all pathways. All emergency survival equipment and supplies had to be flown in by helicopter or taken up the mountain by 4-wheelers; the DRD was developed for this exact scenario. The DRD can also be utilized outside of a disaster zone such as, off grid living, remote camping, RV lifestyle, military support, and small island power and water generation.

The invention is an improvement over existing technology because the DRD utilizes sunlight to convert solar energy into electricity that is stored in lithium iron phosphate deep cycle cells as potential energy. The energy can be utilized at any point in time to filter and clean water or to power a refrigerator, small stove, or medical device, for example. Existing devices such as solar powered reverse osmosis systems or solar generators have previously been developed, but no device currently exists that incorporates both technologies efficiently in a portable waterproof assembly.

An outstanding aspect of the current DRD is that it is fabricated and configured to withstand harsh environments and to remain outdoors constantly during operation. No other solar generator has overcome this deficiency as the rain destroys the electronics of existing solar generators over time. A major advantage of the system is that the DRD can withstand the harsh environmental conditions of six continents throughout the world. The DRD is configured to tolerate torrential downpour rain, wind, earthquakes, extreme heat, sandstorms, physical abuse, and high humidity, for example.

In operation, contaminated, toxic or deadly water is poured into the dirty water holding tank. A pressure switch is engaged when the water level in the dirty water holding tank reaches a predetermined level, which in turn activates an electric water pump that is configured to draw the water from the dirty water holding tank through an eight-stage reverse osmosis system. Once the water travels through all eight stages of the reverse osmosis process so that the water is now clean potable water, a pump fills the clean water holding tank with the clean water. This action does not require any action by the user.

In a particular aspect, the DRD is configured to yield a minimum of seventy-five gallons of clean water per day along with generating up 5 Kilowatts of power with a discharge potential of 9.2 KW per day. This can easily operate the water pump, UV sterilization light, normal size refrigerator, small stove, laptop, or medical device simultaneously, for example. The DRD is configured to support more than one person, but rather a group of people.

This modular capacity is particularly advantageous in disaster relief operations, where affected populations may be geographically dispersed or vary in density. Rather than relying on a single centralized system to support a large group, which can create logistical and operational bottlenecks, the present DRD enables a distributed approach to aid delivery. Multiple identical units can be deployed across an affected zone to create a decentralized network of support nodes, each capable of operating autonomously without reliance on a larger infrastructure or interconnection.

In such configurations, individual units may be assigned to discrete teams, family groups, neighborhoods, or field operations. The use of standardized, self-contained units simplifies logistics, training, maintenance, and replacement. Additionally, because each unit is designed for air transport and rapid deployment, relief agencies can scale up support in real-time by deploying additional units to meet evolving needs on the ground. This modular scalability provides a significant operational advantage over larger containerized systems that are less adaptable and slower to deploy.

The DRD is configured to be used as a power source by turning on the device via a switch and plugging in any device, equipment, or machine into the waterproof outlets. In a particular aspect, the DRD includes four outlets having 20-amp GFCI. The DRD is configured to generate a digital readout on battery consumption that can be used to decide on how best to use the power. The DRD is configured to provide the temporary life support needed until further support arrives later, which could be months.

Preferred dimensions of the DRD in the stowed position are 26" wide, 48" long, 33" in height, and weighing approximately 310 lbs. The DRD is compact but relatively powerful in terms of water filtration and power generation. Accordingly, once a disaster impacts a specific zone, the DRDs can be air freighted very quickly to site. The DRDs can also be dropped out of airplanes via parachute to remote areas that are not easily accessible. The DRD is also sized to fit in a truck or SUV. The DRD is also adaptable to be scaled larger in size but may sacrifice key benefits of shipping versatility along with quick support aid. The DRD transforms from the stowed position into the deployed position and is fully operational in seconds. The rapid solar panel deployment system is an important feature helping make an immediate impact in a disaster zone. Some modular systems currently exist where the technology is all separated into their own independent carry case (solar panels, water purifiers, battery storage all separate). The independent systems require advanced installation connecting different wiring and hoses from one unit to the next. This process is time consuming, adding focus to the equipment rather than victims, during a disaster situation every second counts.

Referring now to FIG. 1, a perspective view of the disaster relief device (DRD) 100 of the present invention is depicted in a deployed position under sunlight 120. The DRD includes a main housing 102 that supports an upper assembly 108 for solar collection and encloses both the electrical power system 106 and the water filtration system 104. A person 126 is shown operating the device adjacent to a body of polluted water 110 containing garbage 112 and contaminants 114. The polluted water is collected with a bucket 116 and introduced into a dirty water storage tank 118, where it is processed by the filtration system. Purified water is directed to a clean water storage tank 122 and dispensed into a potable water jug 124 for consumption.

Unlike prior portable generators or standalone filtration kits, the DRD 100 includes a unique configuration where housing 102 integrates both power system 106 and filtration system 104 into a single deployable unit 100, operable directly in contaminated environments without requiring auxiliary shelters or separate devices.

Figure 2:
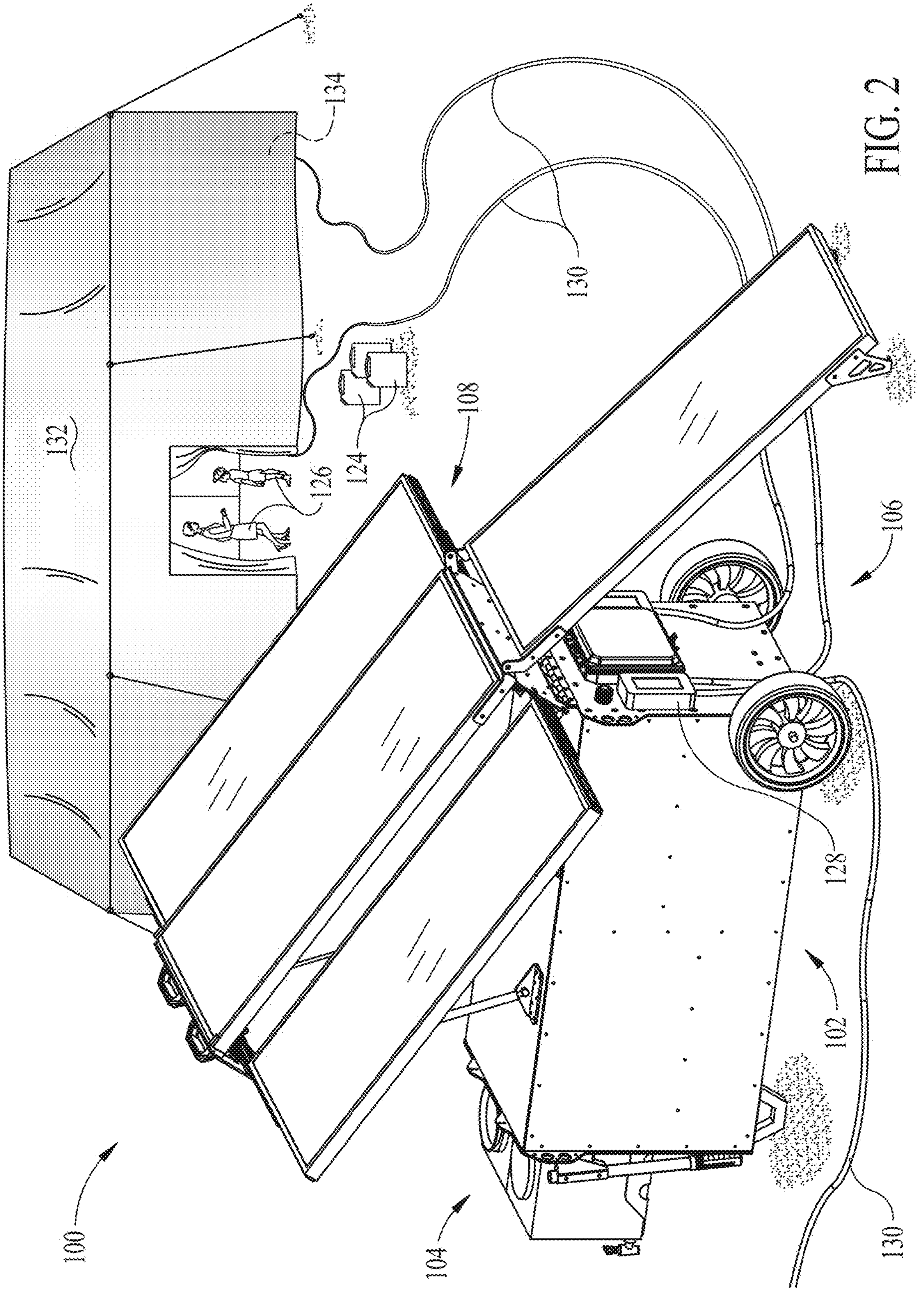
FIG. 2 is a rear perspective view of the DRD in a deployed position and connected via electrical cords to a disaster relief tent.

FIG. 2 is a perspective view of the DRD 100 deployed in the field. The DRD includes the main housing 102 containing the water filtration system 104 and the electrical power system 106, with the upper assembly 108 for solar collection. Electrical power is provided through in-use outlets 128, which connect via an extension cord 130 to a disaster relief tent 132. Within the tent, medical devices and equipment 134 are powered by the DRD 100. A potable water jug 124 is shown to indicate clean water output, and a person 126 is present operating the device. Accordingly, the DRD 100 has the capability to simultaneously supply electrical power and potable water from a single integrated housing 102, enabling rapid support for critical facilities such as tent 132 with medical equipment 134, which is a combination not achieved by conventional relief systems that rely on separate power and water units.

Figure 3:
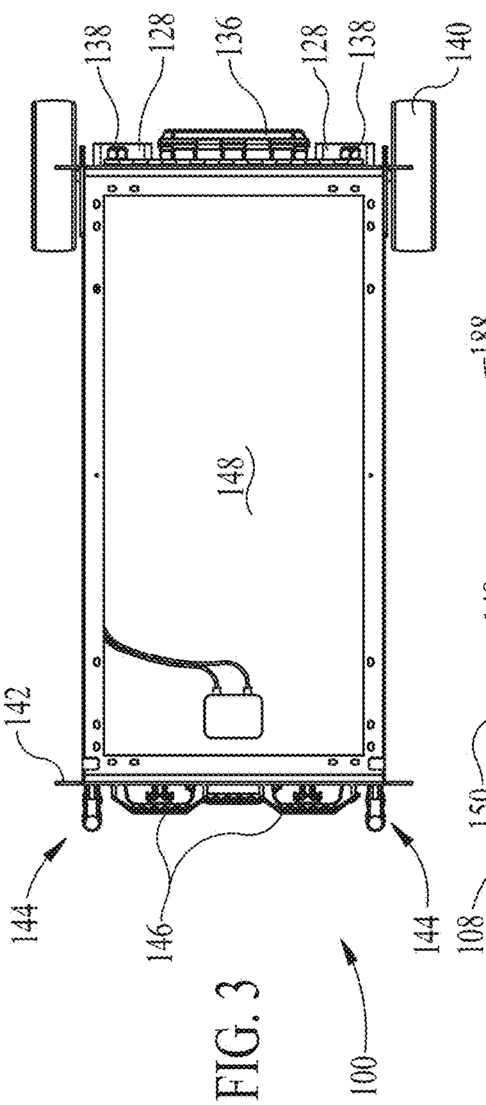
FIG. 3 is a top view of the DRD in a stowed position.

FIG. 3 is a top view of the disaster relief device (DRD) 100 in its stowed configuration. The view shows the folding handle assemblies 144 positioned against the housing, with upper assembly handles 146 secured along the frame. A side wing mounting bracket 142 is visible for supporting beneficial add-on accessories, tie down points, parachute hook points and lifting points. The device is supported on airless tweel wheels 140 (or other type of wheels), providing mobility over uneven terrain. The control panel 136 with a transparent protective cover is positioned adjacent to in-use outlets 128, which are also adjacent to the weatherproof multi-cord grip 138 that allows entry of the solar panel charging cords into the main housing. Above the housing, an upper hinged solar panel 148 is shown stowed flat within the upper assembly.

Figure 4:
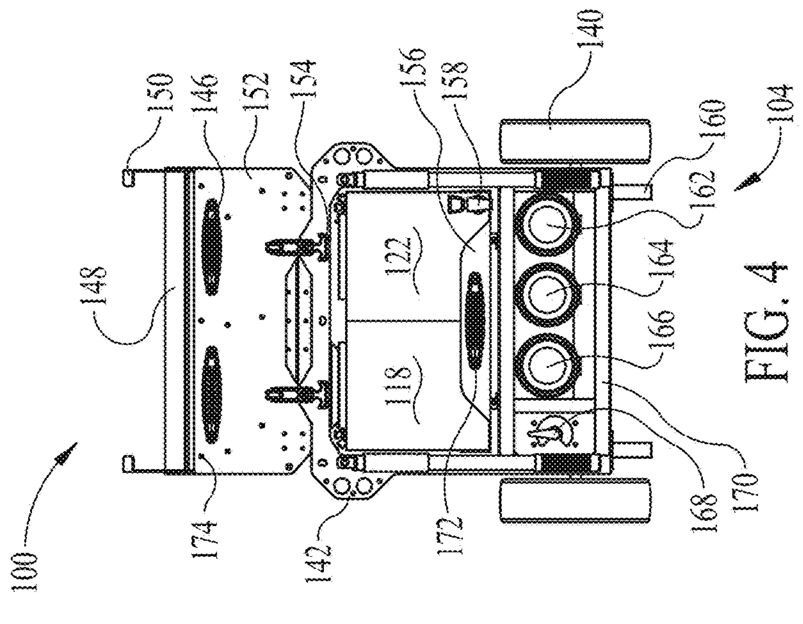
FIG. 4 is a front view of the DRD in a stowed position.

Referring now to FIG. 4, a front view of the disaster relief device (DRD) 100 is depicted. The upper portion of the device shows the upper hinged solar panel 148 in the stowed position, and waterproof rubber hold-down latches 154 fastened to the front plate 152 of the rapid solar deployment system. Upper assembly handles 146 are visible for manipulation, and solar panel foot pads 150 provide structural support.

The water filtration system 104 is enclosed within the housing, with the dirty water storage tank 118 and clean water storage tank 122 shown above. A water storage tank drawer 156 extends outward and incorporates a water dispenser spigot 158. An emergency wastewater recirculation valve 168 is positioned nearby for directing brine either to waste or back into the dirty water storage tank 118.

Supporting structures include the chassis framework 170, mounting provisions such as non-ferrous machine screws 174, and a side wing mounting bracket 142. Multiple stages of filtration are provided by sediment filter housings 162, 164, and 166. At the base, resting foot pads 160 provide stability. A drawer handle 172 is also visible on the front of the housing to assist in extending or retracting the tank drawer 156. The DRD has a unique configuration that includes a front-facing modular arrangement of water purification elements (118, 122, 156, 158, 168, 162-166) combined with a solar deployment assembly (148, 152, 154, 150, 146) and ruggedized transport architecture (170, 174, 140, 160). Unlike prior art systems that treat power and water modules separately, this configuration provides a compact, integrated unit with accessible service points from the front face.

Figure 5:
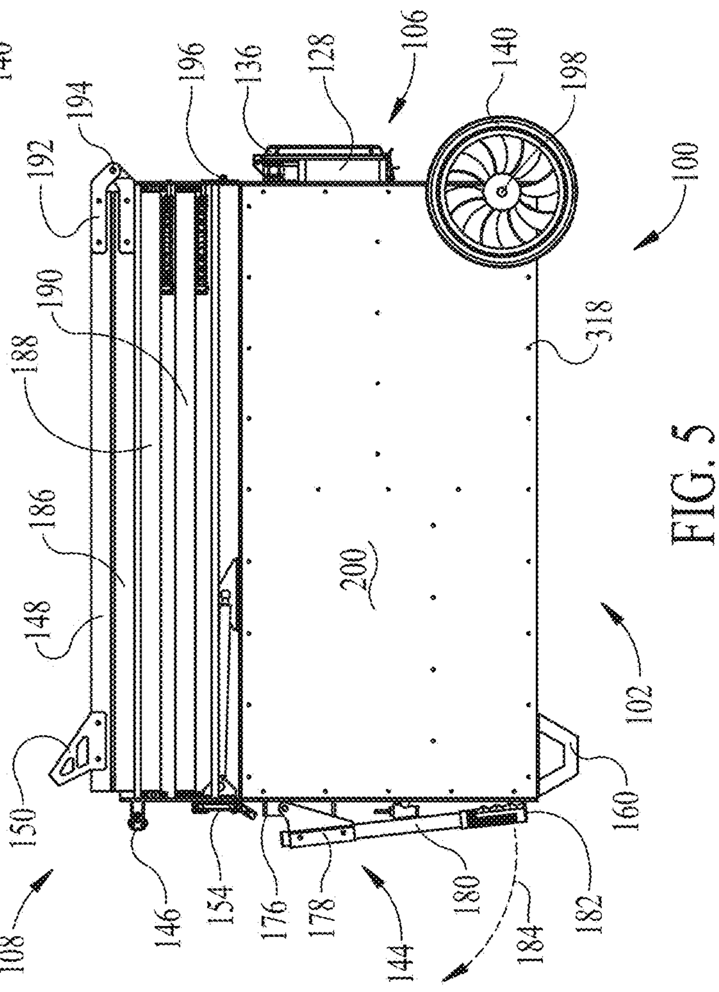
FIG. 5 is a right side view of the DRD in a stowed position.

FIG. 5 is a right-side view of the disaster relief device (DRD) 100 in its stowed configuration. The main housing 102 encloses the electrical power system 106, with external access provided to in-use outlets 128 located beneath the control panel 136. The upper assembly 108 is shown with multiple solar components in their stowed positions, including the upper hinged solar panel 148, fixed solar panel 186, and slide-out solar panels 188 and 190. The panels are secured using waterproof rubber hold-down latches 154, and their movement is supported by a stainless steel piano hinge 196 or similar and associated hinge bearing 194. A solar panel foot pad 150 provides resting when deployed.

Transport and handling features include the folding handle assembly 144, formed with a mounting block 176, a folded handle bracket 178, and round tubing 180 terminating in rubber hand grips 182. The action of folding the handle into transport mode is indicated at 184. At the base, resting foot pads 160 stabilize the housing, while wheels 140 mounted on an axle secured by axle nut 198 provide terrain mobility. A right-side removable panel 200 is affixed to the housing using special machined bullnose groove stainless steel machine screws 318 to seal from weather while permitting service access.

Figure 6:
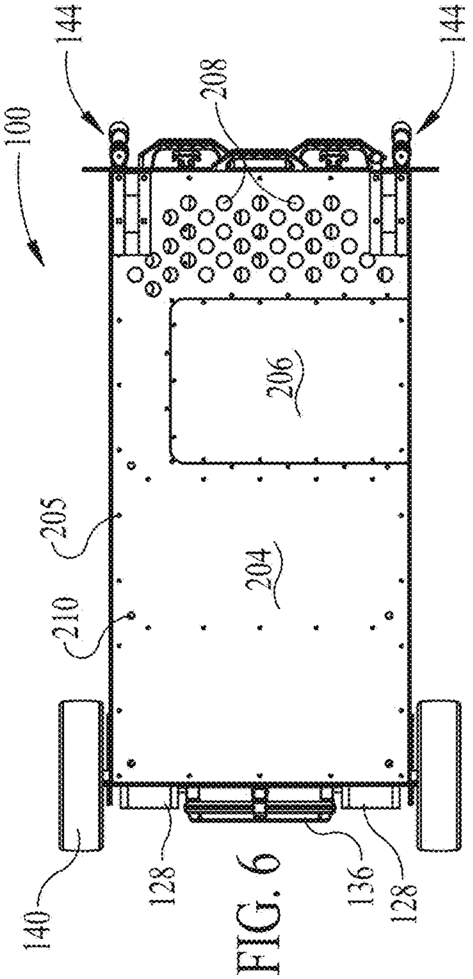
FIG. 6 is a bottom view of the DRD in a stowed position.

FIG. 6 is a bottom view of the disaster relief device (DRD) 100. The underside of the main housing bottom panel 204 is shown, which incorporates drainage holes 210 and weep holes 208 to allow moisture to escape and prevent accumulation inside the housing. A water filtration removable panel 206 is also located on the underside, providing service access to the filtration system. The DRD 100 is supported by the wheels 140 at the rear. The underside view also illustrates the relative position of the control panel 136 and in-use electrical outlets 128, mounted within the sealed housing and extending toward the rear face of the device. A series of evenly spaced rivets or pocket welds 205 are shown securing the bottom panel 204 to the main chassis framework.

The integrated drainage and service architecture (204, 206, 208, 210) of the DRD 100 ensures that the housing remains weatherproof yet field-maintainable. Unlike prior art systems that lack dedicated drainage or require full disassembly for filter service, the DRD provides built-in drainage and a dedicated removable service panel, increasing reliability in harsh environments.

Figure 7A:
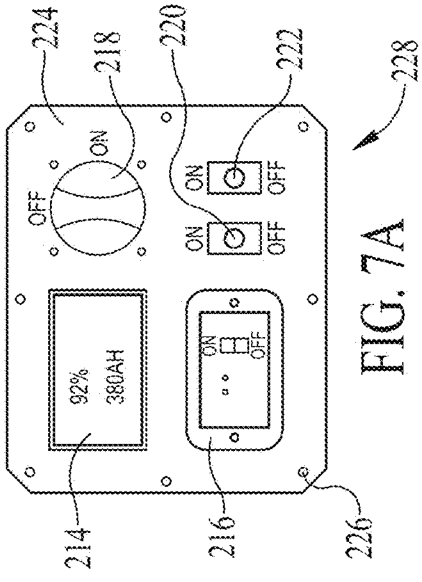
FIG. 7A is a detail view of the control panel of the DRD.
Figure 7:
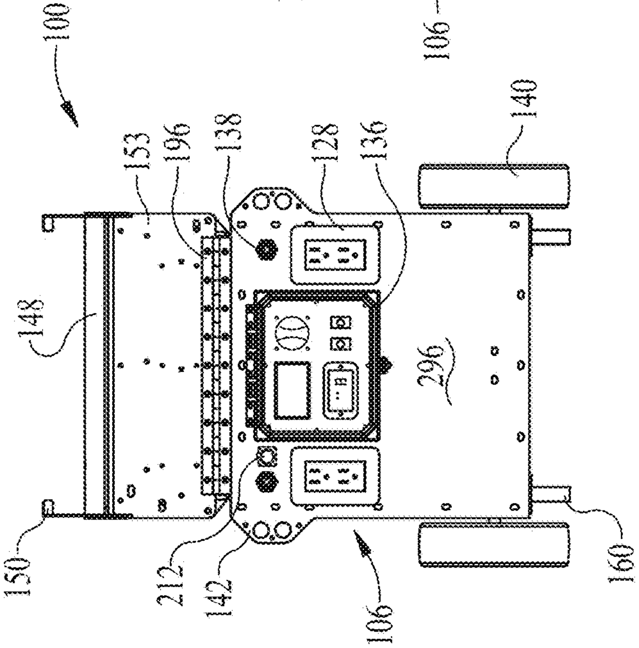
FIG. 7 is a rear view of the DRD in a stowed position.

FIG. 7 is a rear view of the disaster relief device (DRD) 100. The rear face of the main housing 296 shows the control panel 136 with in-use electrical outlets 128, sealed by a weatherproof multi-cord grip 138 waterproofing external connections to the upper solar panel assembly 108. The electrical power system 106 is contained within the housing 102, with outlets accessible from this rear face.

The upper hinged solar panel 148 is shown in the stowed position, supported structurally by the rear plate 153 of the rapid solar panel deployment system. A solar panel foot pad 150 provides resting support when the panel is unfolded. A side wing mounting bracket 142 is also visible, supporting beneficial add-on accessories, tie down points, parachute hook points and lifting points. Structural end plate 153 is configured to support lateral deployment of slide-out solar panels. At the base of the device 100, resting foot pads 160 stabilize the unit when not in motion. The stainless steel piano hinge 196 or similar is also visible, illustrating the mechanical connection enabling pivoting action of the upper solar assembly end plate 153 to the lower rear main housing plate 296. A waterproof solar panel expansion port 212 is mounted at the rear, providing external connectivity for supplemental panels or accessories while maintaining a sealed interface. The arrangement of the components of the DRD 100 differs from prior art units where outlets are exposed or solar panels are fixed. Here, the DRD 100 ensures both environmental protection and rapid expandability from the same rugged rear housing.

Referring now to FIG. 7A, a detailed view of the control panel assembly 228 of the DRD 100 is depicted. The panel includes an LED screen 214 configured to display battery percentage and capacity information, providing real-time monitoring of system status. A power inverter on/off switch 216, a main power on/off switch 218, and a UV sterilizer on/off switch 222 are arranged on the panel for direct operator control of the electrical and water purification subsystems.

The water filtration pump 220 is also controlled from this panel 228, enabling activation of the filtration sequence as required. The control elements are mounted onto a control panel mounting plate 224, which is secured to the housing by a set of screw holes 226. The underlying wiring, fuses, and related circuitry are collectively included the control panel electrical assembly 228. The integrated operator interface (214, 216, 218, 220, 222, 224, 226, 228) unites power, water filtration, and sterilization controls in a single sealed panel. Unlike prior devices that require separate control modules for power and water functions, the DRD 100 consolidates all essential operations into one ruggedized, weatherproof assembly 228.

Figure 8:
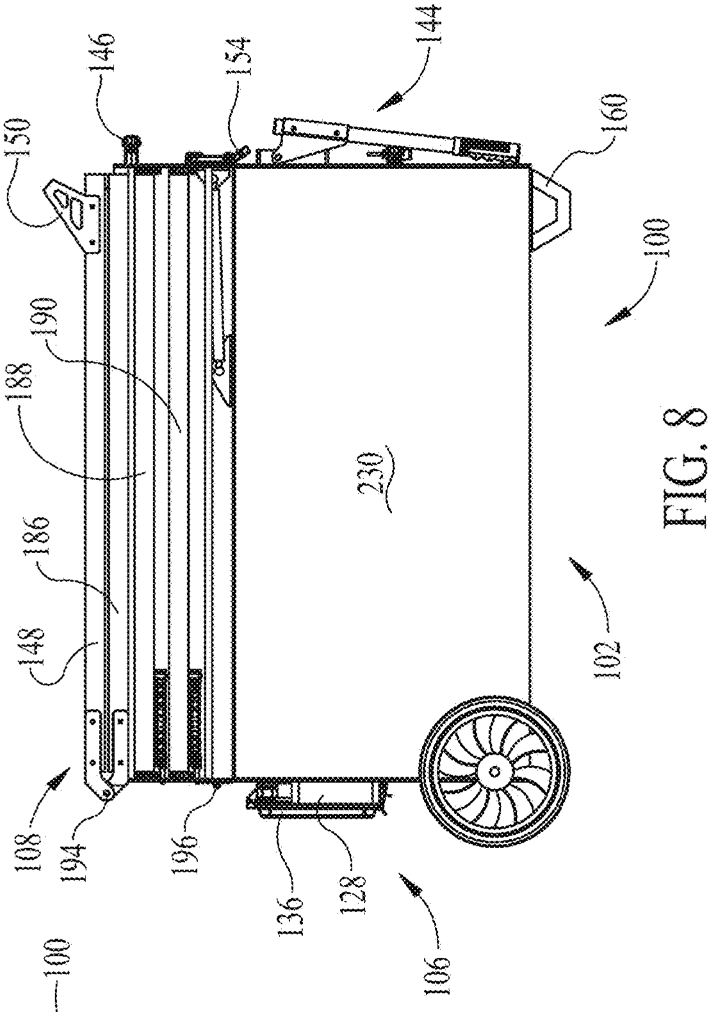
FIG. 8 is a left side view of the DRD in a stowed position.

FIG. 8 is a left-side view of the DRD 100 in its stowed configuration. The main housing 102 supports the electrical power system 106, which is accessible through the control panel 136 and in-use electrical outlets 128 located on the rear of the device. The upper assembly 108 is shown with its upper hinged solar panel 148 folded flat, covering the fixed solar panel 186 and concealing the slide-out solar panels 188 and 190 within the housing. A solar panel foot pad 150 provides structural support for the panels when placed in the deployed position. As discussed above, the entire upper solar panel assembly 108 can pivot and is fully supported in the rear by the piano hinge or similar 196 allowing optimal solar tilt. Pivoting hinge bearing assembly 194 is connected to the fixed solar panel 186 and joined to the upper solar panel 148 allowing free range of motion.

Additional structural features include the left-side fixed panel 230, which forms part of the housing, and the waterproof rubber hold-down latches 154 that secure the solar panels during transport. For mobility and handling, the folding handle assemblies 144 with upper assembly handles 146 are positioned on the front side of the unit, while resting foot pads 160 stabilize the DRD when stationary.

Figure 9:
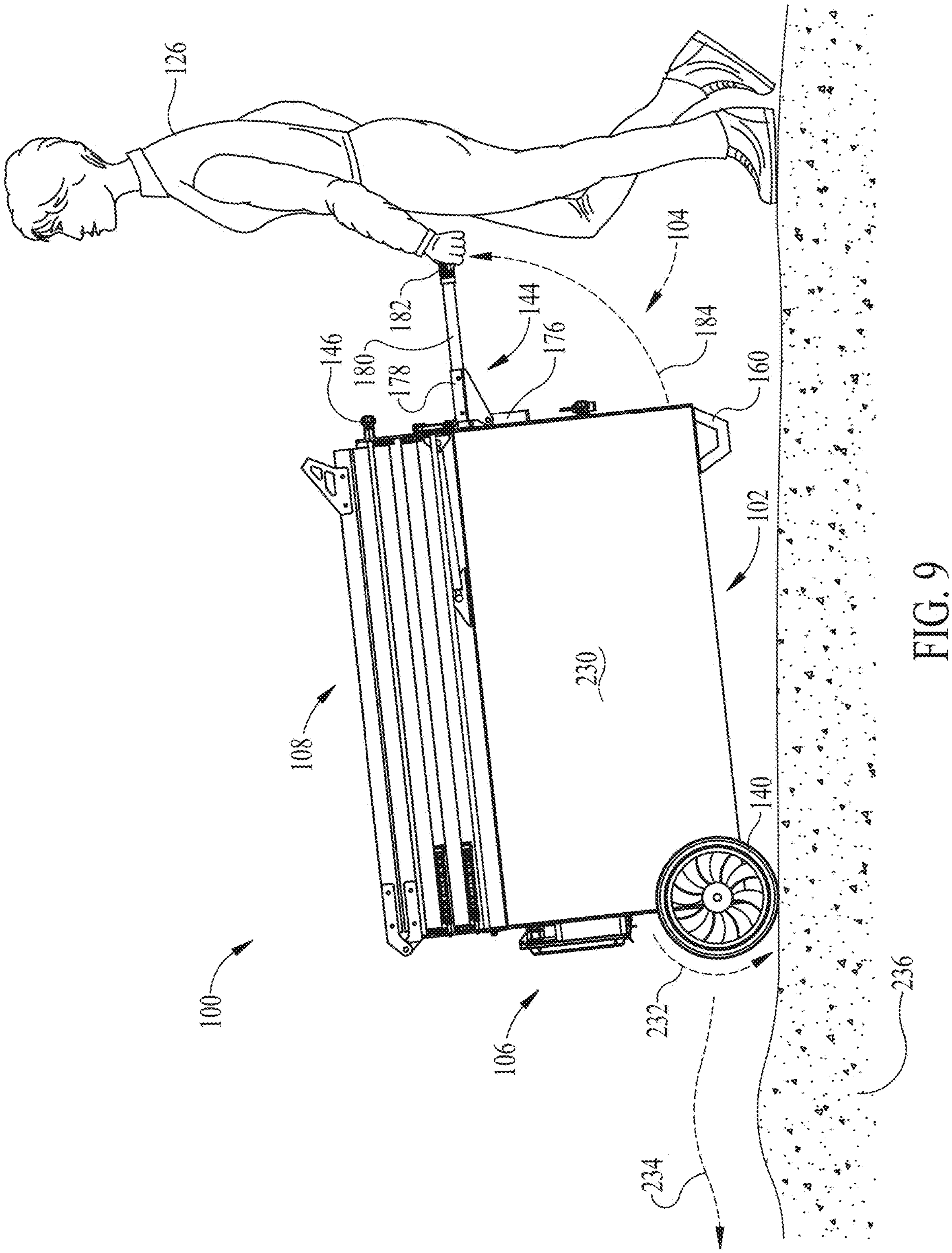
FIG. 9 is a left side view of the DRD in a stowed position being wheeled for transport.

Referring now to FIG. 9, a left-side view of the DRD 100 in its stowed configuration while being wheeled and transported by a person 126. As discussed above, the main housing 102 contains the water filtration system 104, the electrical power system 106, and supports the upper assembly 108 for solar deployment. The DRD is maneuvered over the ground 236 by rotating the wheels 140 in the direction of forward rotation 232, resulting in the forward movement action 234. Stability during transport is assisted by resting foot pads 160, which lift clear of the ground when the unit is tilted for rolling. In another aspect, the wheels 140 may be electrically powered to assist in the transport of the DRD 100.

The folding handle assembly 144 includes structural elements such as the mounting block 176, formed bracket 178, and round tubing 180, each terminating in rubber hand grips 182. The handles are secured with upper assembly handles 146 and pivot during the action of folding into transport mode 184, enabling ergonomic movement by a single operator. The left-side fixed panel 230 provides structural enclosure during this motion. In contrast to existing devices that require multiple personnel or external carts, the DRD 100 is self-contained and readily wheeled by one person, even over uneven terrain.

Figure 10A:
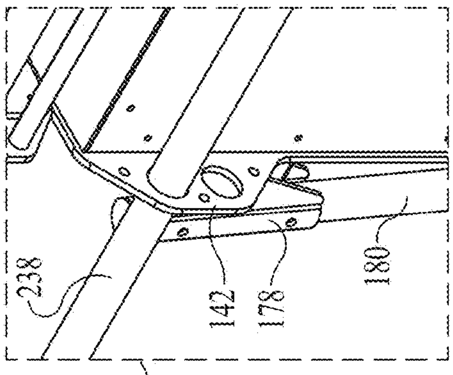
FIG. 10A is a detail view of a lifting bar.
Figure 10:
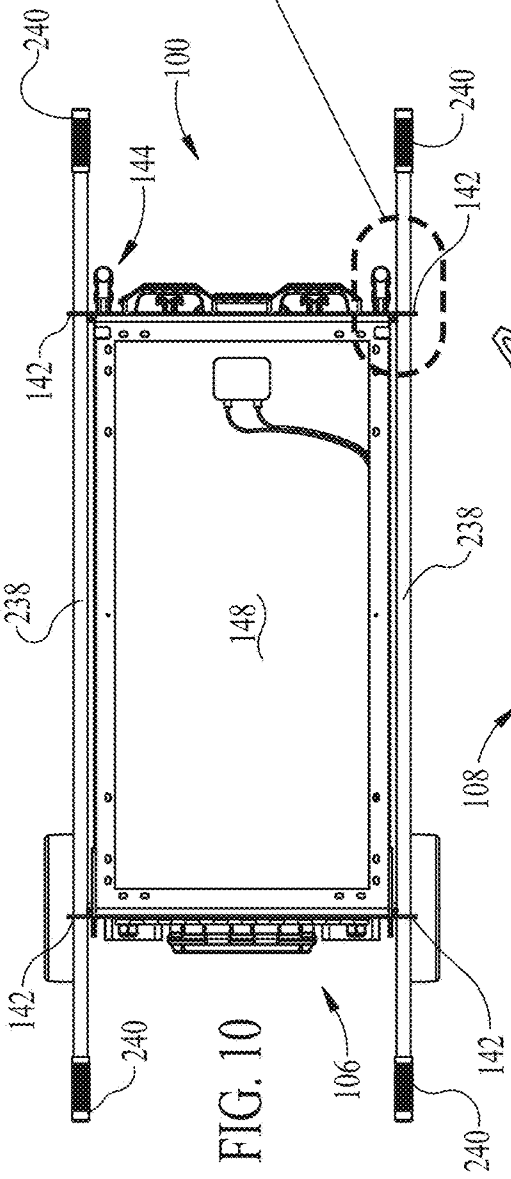
FIG. 10 is a top view of the DRD in a stowed position with lifting bars installed.

FIG. 10 is a top view of the DRD 100 in its stowed configuration with a pair of lifting bars 238 installed. The folding handle assemblies 144 are shown secured to the housing 102 and configured for transport. The pair of lifting bars 238 extend across the top of the device 100, each equipped with rubber hand grips and nonslip grooves 240 to facilitate manual lifting. The upper hinged solar panel 148 is visible in its stowed position atop the device 100, and side wing mounting brackets 142 are arranged along both sides of the housing 102 providing a sturdy structural mounting point. The electrical power system 106 is contained within the main housing 102 and remains sealed during transport. The DRD 100 has dual-mode mobility, where it can be rolled on wheels (FIG. 9) or lifted using dedicated lifting bars 238 with grips 240. This capability allows a small team to move the DRD 100 into difficult terrain or onto transport vehicles without external equipment, which is an advancement over prior relief units that lack integrated lifting provisions.

FIG. 10A is a detailed view of a portion of the lifting bar assembly of the disaster relief device (DRD). The lifting bar 238 is shown secured to the housing 102 by side wing mounting brackets 142, which provide stable attachment points for manual handling. The lifting bar 238 is not a temporary accessory but structurally integrates with brackets 142. Also shown are the folding handle components 180, 178 in which the lifting bar 238 avoids any disruption of the folding handles motion, allowing for maximum transport flexibility. This construction allows reliable manual lifting without supplemental rigs or frames, improving deployment speed compared to prior devices.

Figure 11:
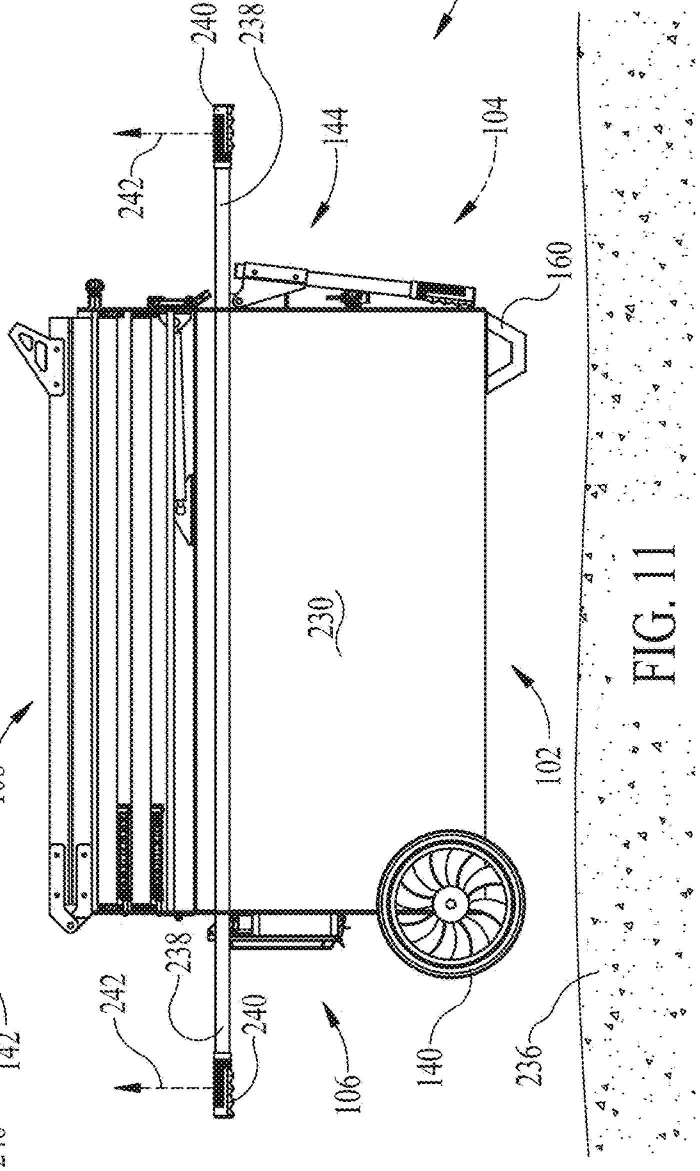
FIG. 11 is a left side view of the DRD in a stowed position with lifting bars raising the device off the ground.

FIG. 11 is a left-side view of the disaster relief device (DRD) 100 in its stowed configuration with lifting bars 238 engaged and the unit 100 being lifted off the ground 236. The main housing 102 encloses the water filtration system 104 and electrical power system 106, while the upper assembly 108 is secured in its stowed position. The DRD 100 is raised using the lifting bars 238, each fitted with the rubber hand grips 240 and nonslip grooves, allowing operators to maintain secure handling during lifting. The action of lifting the entire DRD assembly is illustrated by arrow 242.

Supporting structural elements include the left-side fixed panel 230, folding handle assemblies 144, and resting foot pads 160, which provide stability when the unit is lowered back into position. The wheels 140 remain attached for rolling mobility when not lifted. Unlike prior relief devices that require external dollies or slings, the built-in lifting system of the DRD 100 enables manual hoisting over debris, uneven ground, or onto transport vehicles.

Figure 12:
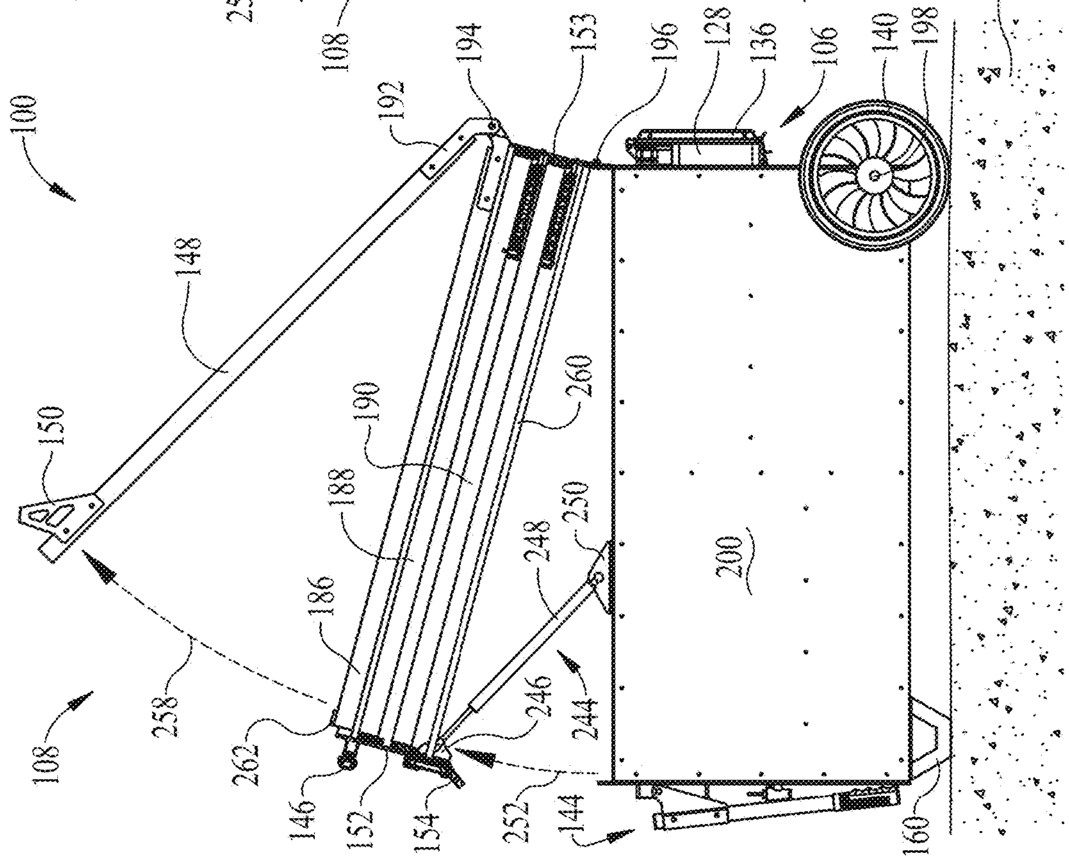
FIG. 12 is a right side view illustrating action of the rapid solar deployment system.

FIG. 12 is a right-side view of the DRD 100 illustrating the action of the rapid solar panel deployment system. The main housing 102 encloses the electrical power system 106, with operator access provided at the control panel 136 and in-use outlets 128. The upper assembly 108 contains multiple solar components, including the upper hinged solar panel 148, the fixed solar panel 186, and the slide-out solar panels 188 and 190. The deployment motion of the upper hinged panel is shown as pivoting action 258, moving from the stowed to the deployed position. This motion is stabilized the hinge bearing 194 and bracket 192, and reinforced by the fixed solar panel frame 186.

Structural support elements include the front plate 152, hold-down latches 154, and reinforcing strut 260, with a rubber cushion pad 262 ensuring impact absorption during motion. The hinged upper assembly is further assisted by a gas shock assembly 244, including the upper mounting bracket 246, stainless steel gas shock 248, and lower mounting bracket 250, which together control the assisted lifting action 252 of the entire upper solar panel assembly 108. Additional visible components include the folding handle assemblies 144, upper assembly handles 146, right-side removable panel 200, and resting foot pads 160. The DRD rides on the wheels 140 secured by an axle nut 198, enabling deployment over the ground 236 while in motion. In contrast to existing systems, the DRD 100 allows rapid, controlled unfolding and extension of multiple panels, stabilized by struts 260 and cushions 262, for immediate readiness in the field.

Figure 13:
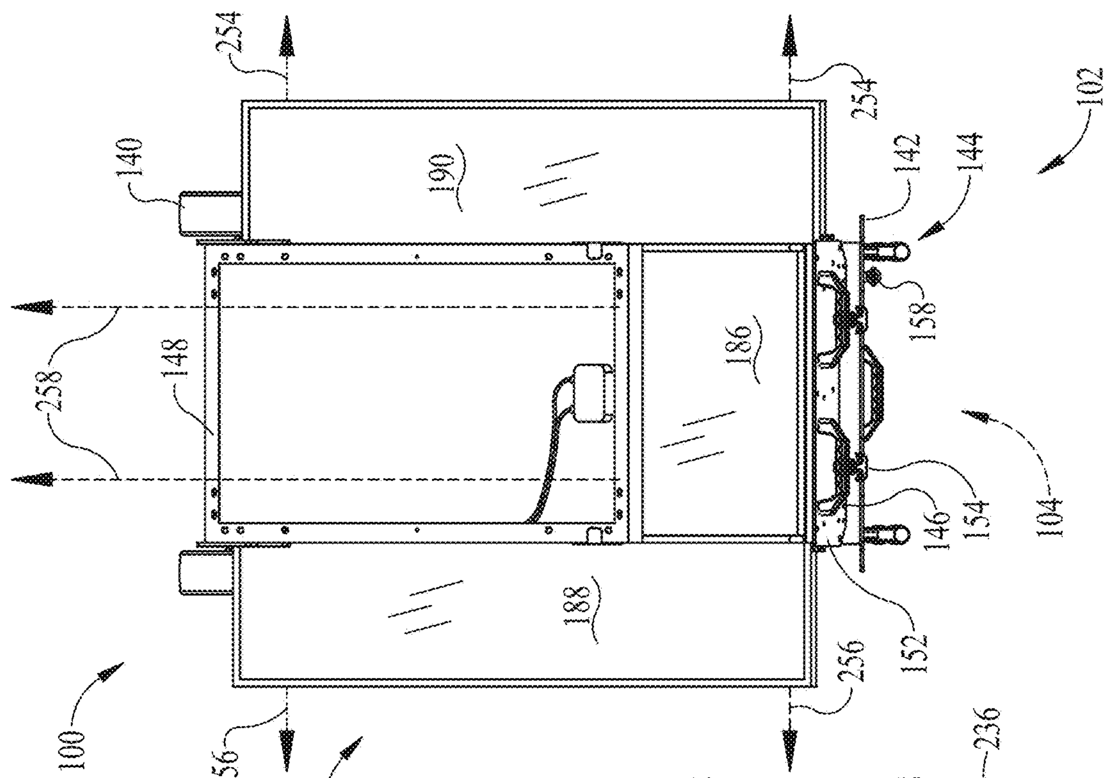
FIG. 13 is a top view illustrating action of the rapid solar deployment system.

Referring now to FIG. 13, a top view of the DRD 100 is depicted showing another view of the action of the rapid solar panel deployment system. The upper hinged solar panel 148 is shown pivoting upward in the panel pivot action 258, while the fixed solar panel 186 remains fixed as a structural component of the upper assembly. On each side of the housing 102, the left slide-out solar panel 188 and the right slide-out solar panel 190 are illustrated extending outward in sliding actions 254 and 256, respectively. These motions are stabilized and guided by linear slides connected to front and rear upper end plates 152, 153 and secured by the waterproof rubber hold-down latches 154 when stowed. The upper assembly handles 146 provide operator leverage for initiating the deployment process assisted by the gas shock assembly 244.

The water filtration system 104 and water dispenser spigot 158 are shown in the housing 102 as part of the integrated clean water delivery function. The folding handle assemblies 144 remain visible for maneuverability, while the wheels 140 provide ground mobility during repositioning. FIG. 13 also demonstrates the multi-directional solar expansion of the DRD 100, where the panels deploy upward (258) and laterally (254, 256) in a coordinated sequence. Unlike prior systems that rely on a single unfolding panel, this design maximizes solar capture area without requiring external frames or supports, enabling rapid, tool-free deployment directly in the field all within a condensed space.

Figure 14:
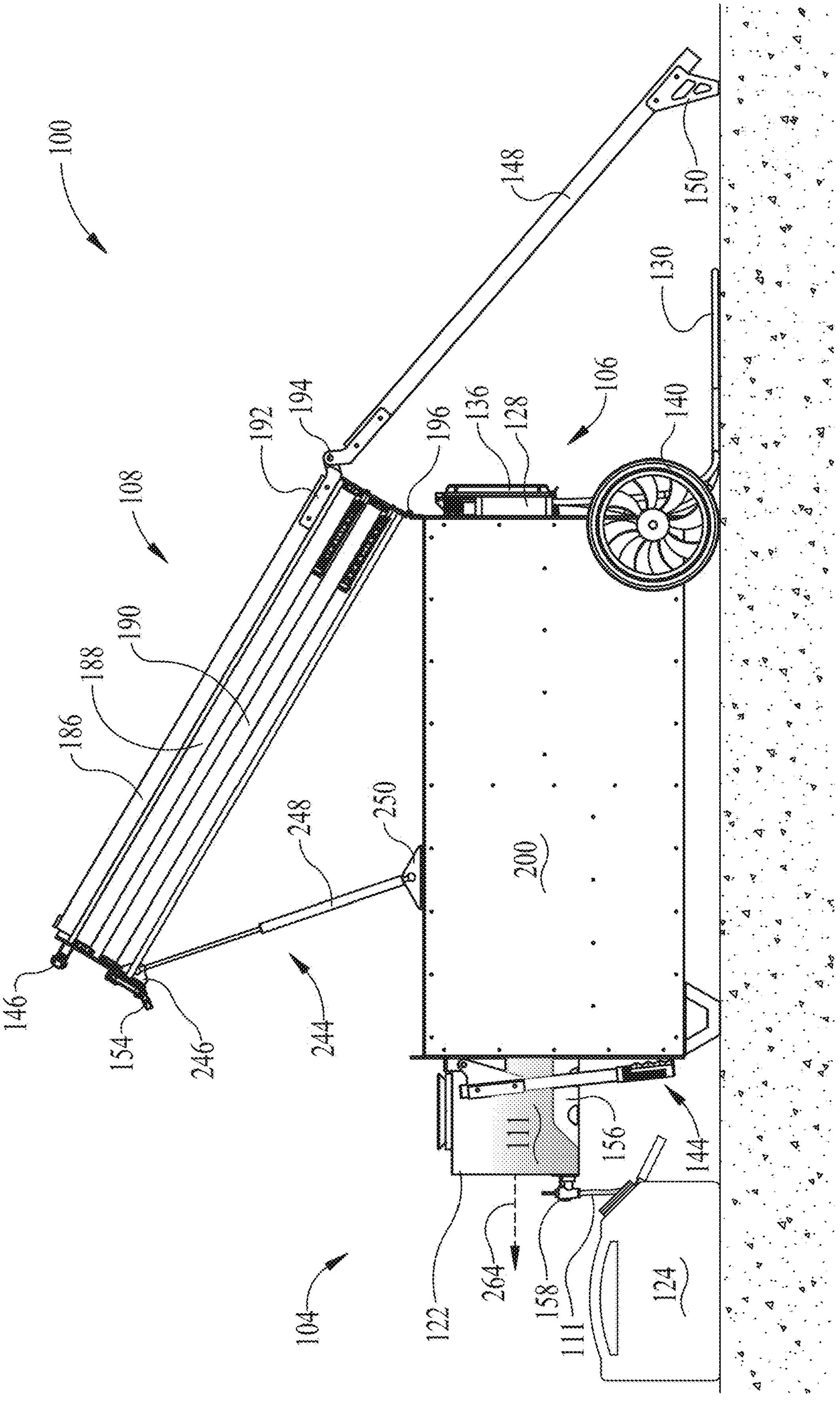
FIG. 14 is a right side view of the DRD in a deployed position.

FIG. 14 is a right-side view of the DRD 100 in its deployed position. As explained above, the main housing 102 encloses the electrical power system 106 and water filtration system 104, with operator access provided via the control panel 136 and in-use outlets 128. The upper assembly 108 is structurally connected to the lower housing 102, 296 assembly by the stainless steel piano hinge or similar 196. The upper hinged solar panel 148 pivoted into its operational angle, supported by the hinge bearing 194, and hinge bracket 192. Additional solar energy is captured through the fixed solar panel 186, the left slide-out solar panel 188, and the right slide-out solar panel 190. Solar panel foot pads 150 stabilize the assembly when extended. The hinged deployment is aided by the gas shock assembly 244, comprising the upper mounting bracket 246, the gas shock 248, and the lower mounting bracket 250, ensuring smooth and controlled extension. The waterproof rubber hold-down latches 154 and upper assembly handles 146 secure and provide manual leverage for positioning.

The water system includes the clean water storage tank 122, the water storage tank drawer 156, and a water dispenser spigot 158, which collectively allow treated water 111 to be dispensed into the potable water jug 124. The action of pulling the drawer to an extended position is indicated at 264. The right-side removable panel 200 provides access for servicing internal components. An extension cord 130 is shown connecting to the power system for delivering electricity to external devices.

Figure 15:
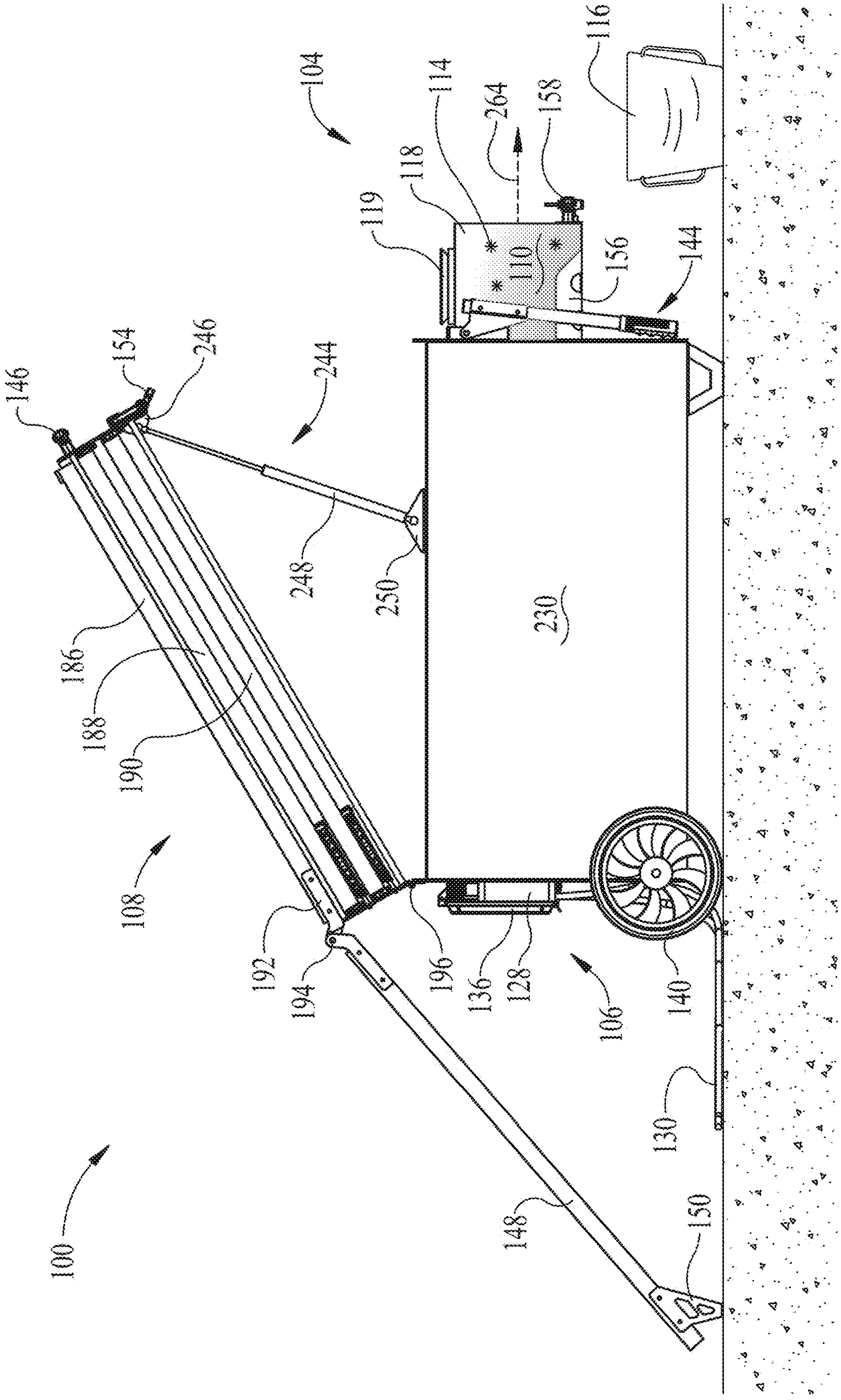
FIG. 15 is a left side view of the DRD in a deployed position.

FIG. 15 is a left-side view of the disaster relief device DRD 100 where the upper assembly 108 is shown supporting the upper hinged solar panel 148, which pivots on the hinge bracket 192, hinge bearing 194, and the stainless steel piano hinge or similar 196. On the water treatment side, contaminated water 110 containing contaminants 114 is introduced with the bucket 116 into the dirty water storage tank 118, equipped with a funnel ring filter sock holder 119. The water filtration system 104 processes the water and dispenses clean output through the water storage tank drawer 156, fitted with the water dispenser spigot 158. The drawer action 264 indicates extension for access and dispensing.

Figure 16:
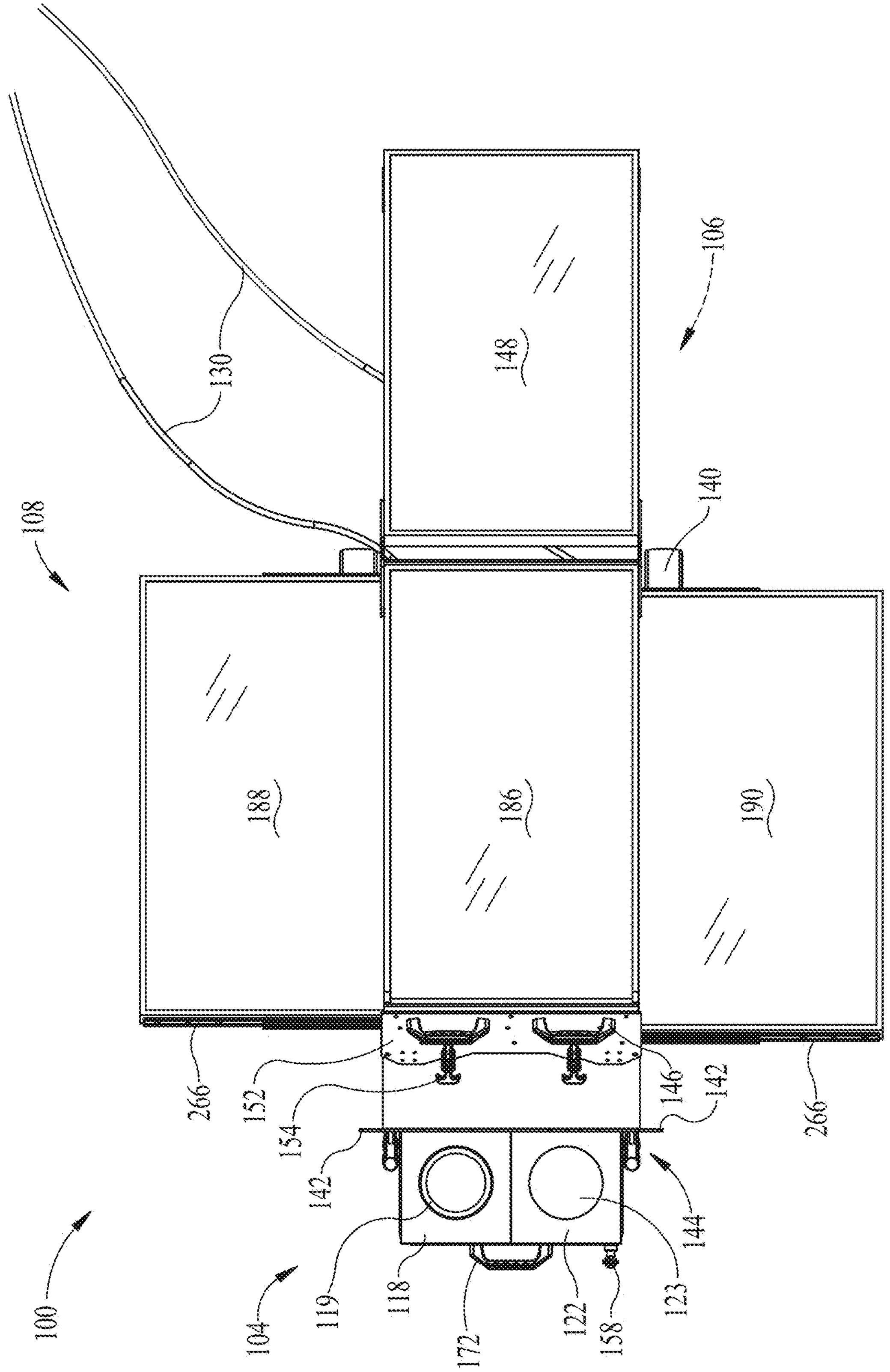
FIG. 16 is a top view of the DRD in a deployed position.

FIG. 16 is a top view of the disaster relief device DRD 100 in its deployed position showing that the upper assembly 108 supports the upper hinged solar panel 148, the fixed solar panel 186, and the slide-out panels including the left solar panel 188 and right solar panel 190, which are each extended outward along extended linear slides 266. Within the housing 102, the water filtration system 104 is shown with the dirty water storage tank 118, which incorporates the funnel ring filter sock holder 119 at its inlet. Adjacent is the clean water storage tank 122, configured with the water dispenser spigot 158 with a removable watertight lid 123 to access inside the clean water tank. The drawer handle 172 facilitates extension and retraction of the tank drawer assembly for service and use. FIG. 16 highlights the multi-panel solar deployment of the DRD 100 combined with a drawer-based water purification and delivery system that maximizes solar capture while enabling user-friendly access to clean water storage and dispensing in a compact, integrated form.

Figure 17A:
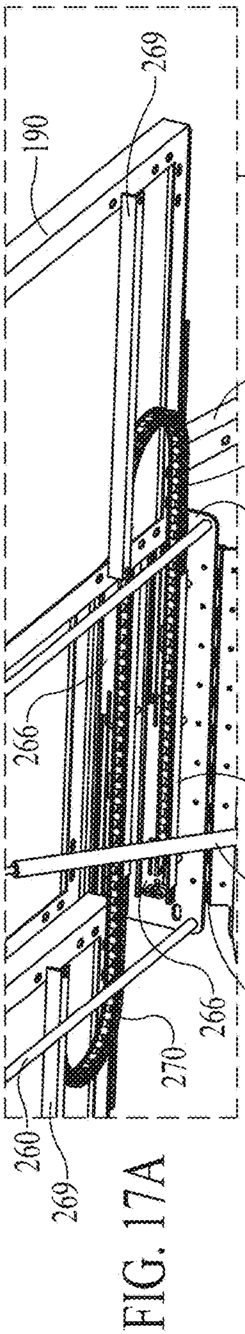
FIG. 17A is a detail view of the rapid solar panel deployment system.
Figure 17:
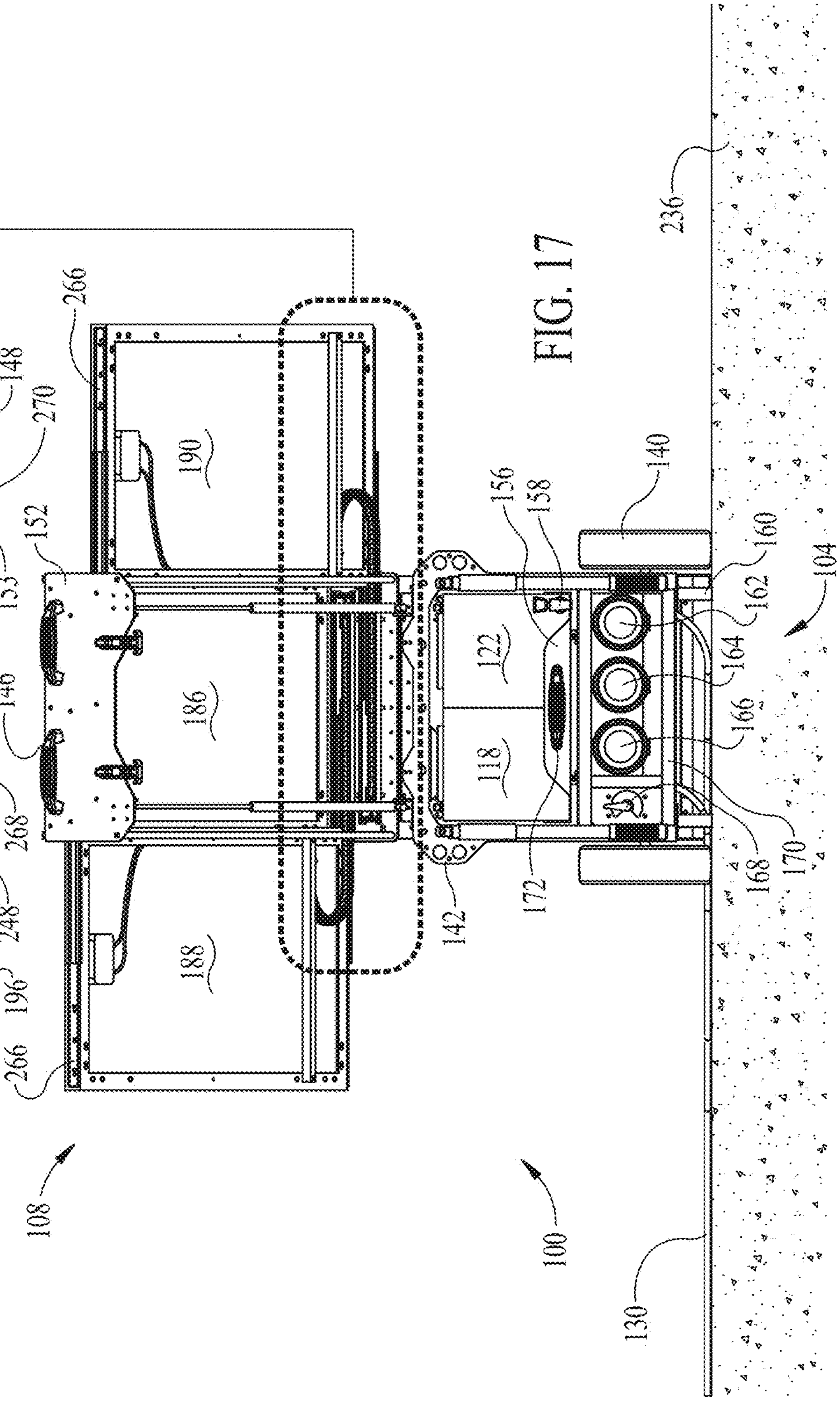
FIG. 17 is a front view of the DRD in a deployed position.

FIG. 17 is a front view of the DRD 100 in its deployed position. The upper assembly 108 supports the fixed solar panel 186, along with the left slide-out panel 188 and right slide-out panel 190, which extend outward on extended linear slides 266.

FIG. 17A is a detailed view of the rapid solar panel deployment system of the DRD 100. The right slide-out solar panel 190 is shown supported by extended linear slides 266, which guide the deployment motion. The hinged motion of the assembly is enabled by a stainless steel piano hinge or similar 196, which is connected to the rear upper assembly plate 153, providing structural stability a reinforced strut 260. Controlled lifting articulation is provided by a stainless steel gas shock 248. Cable routing for the solar panels is organized using cable carriers 270, which are supported by cable carrier holders 268 and 269 to ensure safe and flexible movement of wiring during deployment or retraction. FIG. 17A highlights the integrated cable management (268, 269, 270) of the DRD 100 within the rapid solar deployment system (190, 196, 248, 266, 153, 260). In contrast to existing systems that risk wire fatigue or exposure during solar panel deployment, the DRD 100 ensures reliable electrical connectivity through guided carriers while maintaining structural reinforcement, resulting in a more durable and field-ready design.

Figure 18:
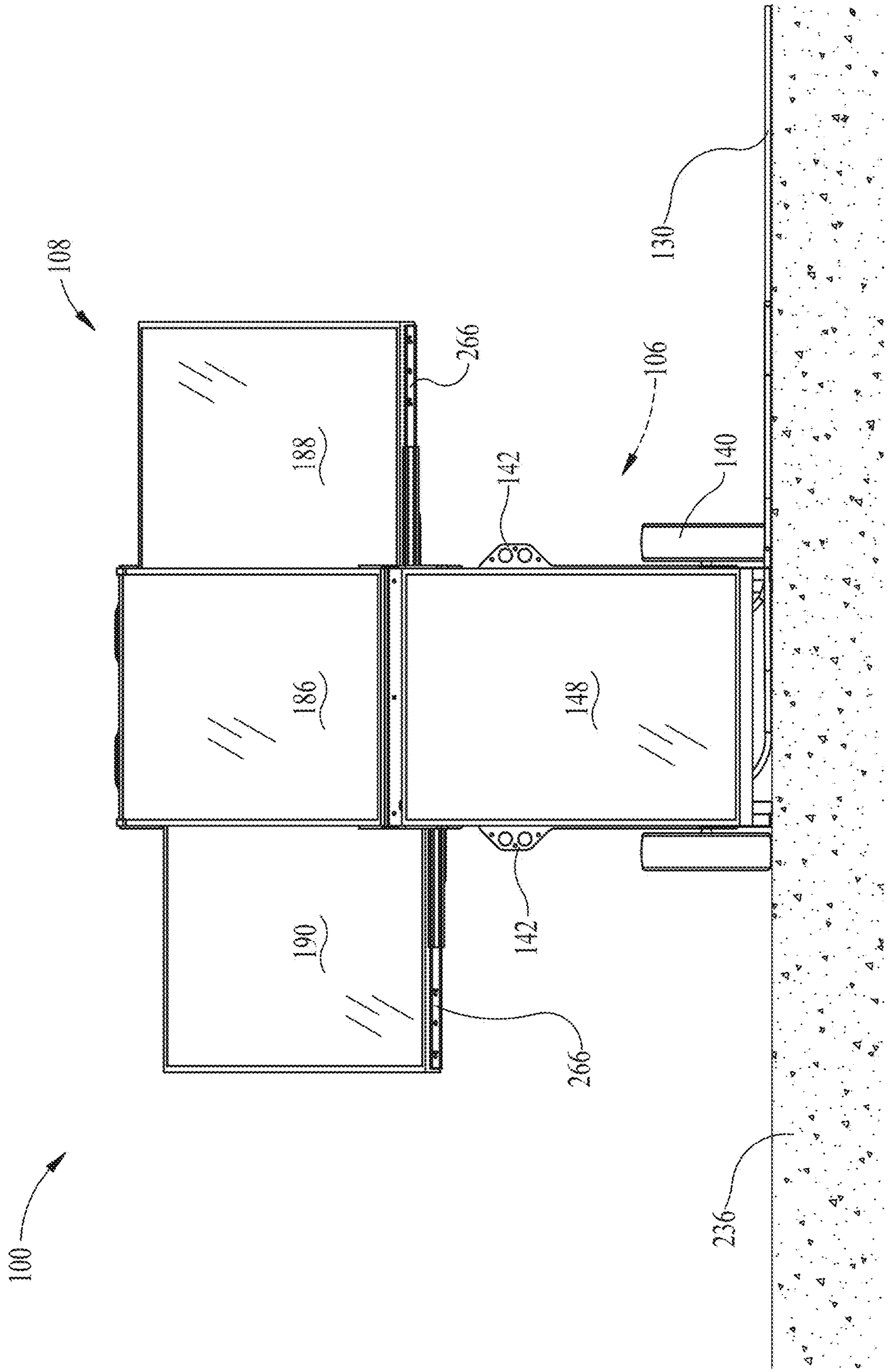
FIG. 18 is a rear view of the DRD in a deployed position.

FIG. 18 is a rear view of the DRD 100 in its deployed position. The upper assembly 108 is shown with the upper hinged solar panel 148 lowered into the deployed position and the fixed solar panel 186, left slide-out solar panel 188, and right slide-out solar panel 190 fully extended outward on extended linear slides 266. The electrical power system 106 is housed within the main body and delivers output through external connections such as an extension cord 130. The DRD 100 integrates a complete rear-expanding solar system in a rugged, mobile platform.

Figures 19, 19A:
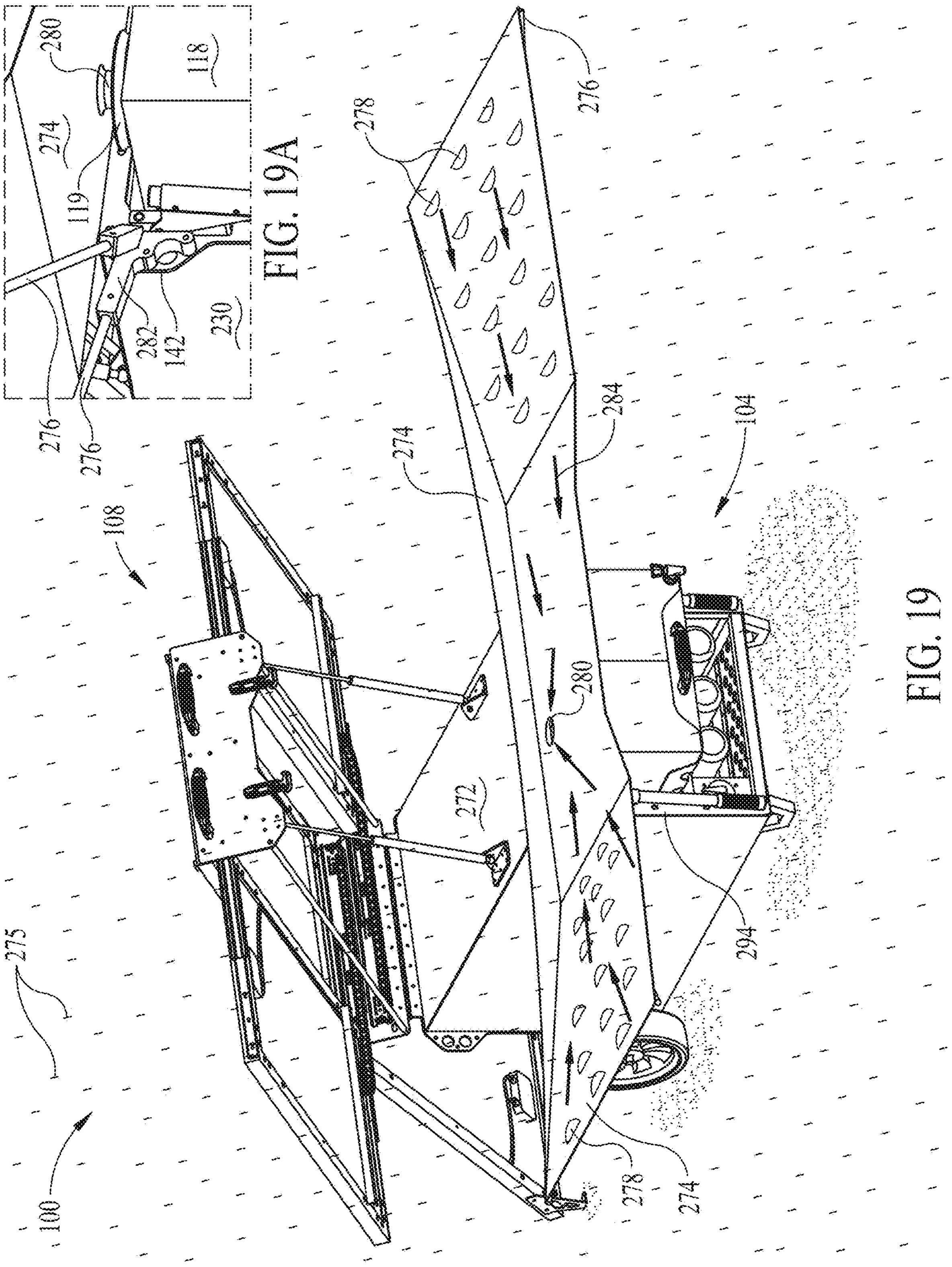
FIG. 19 is a perspective view of the DRD deployed with a rain collection system during rainfall.
FIG. 19A is a detail view of mounting brackets and poles for the rain collection system.

FIG. 19 is a perspective view of the DRD 100 deployed with its bolt-on rain collection system during rainfall. The upper housing assembly panel 272 is watertight shedding heavy rainfall keeping internal components dry. Rain collection fabric 274 (e.g. Dyneema or polyester) is stretched outward using outrigger poles 276. The fabric 274 is configured with wind pressure relief flaps 278 that allow air to pass through without permitting rain intrusion, preventing damage during high winds. Rainwater 275 is collected by the non-permeable rain collection fabric 274 in which the sloped design aspect directs the rainwater movement 284 towards the funnel drain 280 where it enters the treatment sequence for purification. The front main housing plate 294 provides structural mounting for the rain collection system and directs water into the intake path. The DRD 100 incorporates a compact, deployable rainwater capture assembly built onto the same portable housing, ensuring autonomous water supply during field use.

FIG. 19A is a detailed view of the mounting bracket and support system for the rain collection assembly. The rain collection outrigger poles 276 are secured into five-axis machined alloy outrigger pole holders 282, which are anchored to the side wing mounting brackets 142 and the left-side fixed panel 230 of the housing. The rain collection fabric 274 is tensioned across the outrigger poles 276 and shaped into a fabric funnel or scoop 280 that directs rainfall into the dirty water storage tank 118. Entry is managed through the funnel ring filter sock holder 119, which ensures that larger particulates are screened before water proceeds into the filtration system. The DRD 100 provides a dedicated, modular rain harvesting system engineered directly into the housing, enabling reliable deployment in adverse weather.

Figure 20:
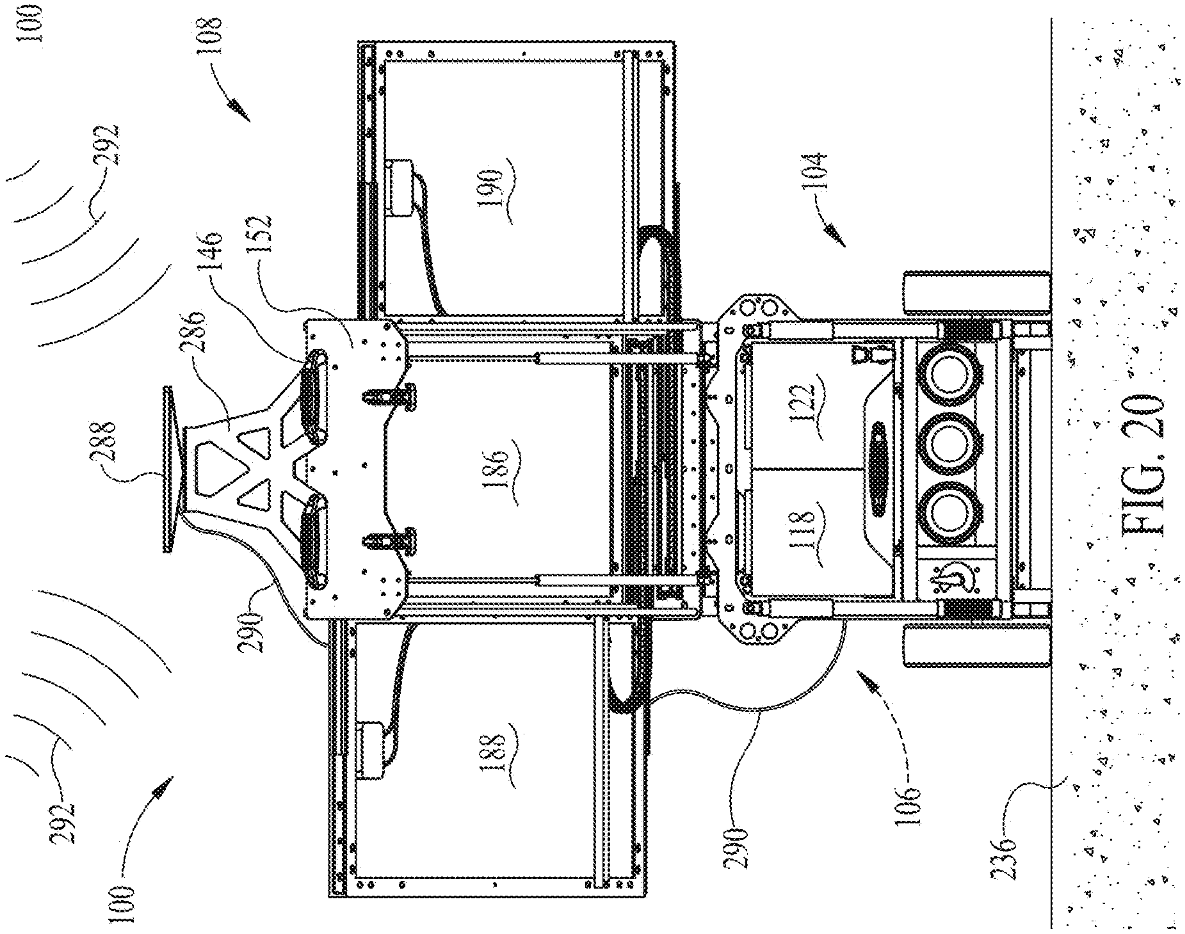
FIG. 20 is a front view of the DRD in a deployed position with a satellite communications bracket assembly and active satellite signal.

FIG. 20 is a front view of the DRD 100 deployed with a satellite bracket assembly and active satellite signal reception. The upper assembly 108 supports the fixed solar panel 186, the left slide-out solar panel 188, and the right slide-out solar panel 190, with the front plate 152 and upper assembly handles 146 visible for structural support and operator use. Mounted on the assembly is the satellite mounting bracket 286, which secures the satellite communications unit 288 (e.g. Starlink). A power cord 290 connects the satellite unit 288 to the electrical power system 106, allowing it to draw energy directly from the onboard solar generation and battery storage. The unit 288 is shown receiving a low-orbit satellite signal 292 for data connectivity. The integrated satellite communications capability (286, 288, 290, 292) of the DRD paired with renewable solar power and clean water production (104, 118, 122, 186, 188, 190, 106) is unlike prior art systems that require separate satellite units and independent power sources. The DRD 100 provides a single, self-sustaining platform for both life support and communications, critical in disaster and remote field operations.

Figure 21:
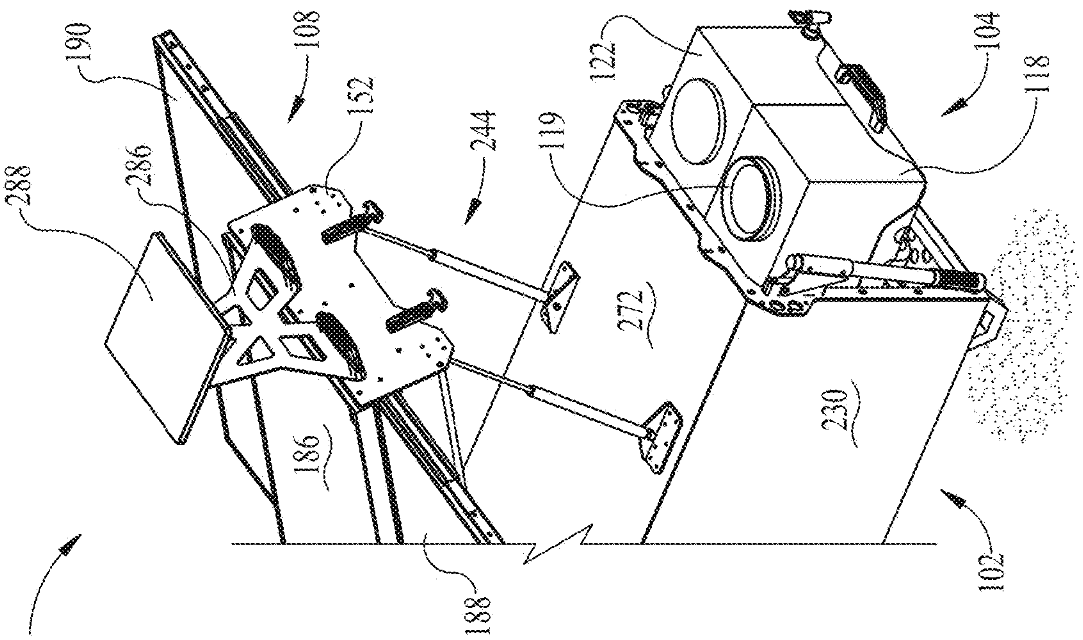
FIG. 21 is an perspective view of the DRD in a deployed position with the satellite communications assembly and active satellite signal.

FIG. 21 is a perspective view of the DRD 100 deployed with the integrated satellite communications system 288. The satellite mounting bracket 286 is affixed to the assembly and holds the satellite communications unit 288, providing resilient satellite-based connectivity directly from the DRD platform. The seamless integration of satellite communications (286, 288) with solar deployment (108, 186, 190, 152, 244) and water treatment systems (104, 118, 119, 122) of the DRD 100 is unlike prior devices, which rely on standalone communications gear and independent life-support units. In contrast, the DRD 100 consolidates power, water, and data connectivity into one mobile, ruggedized platform-streamlining disaster relief deployment.

Figure 22:
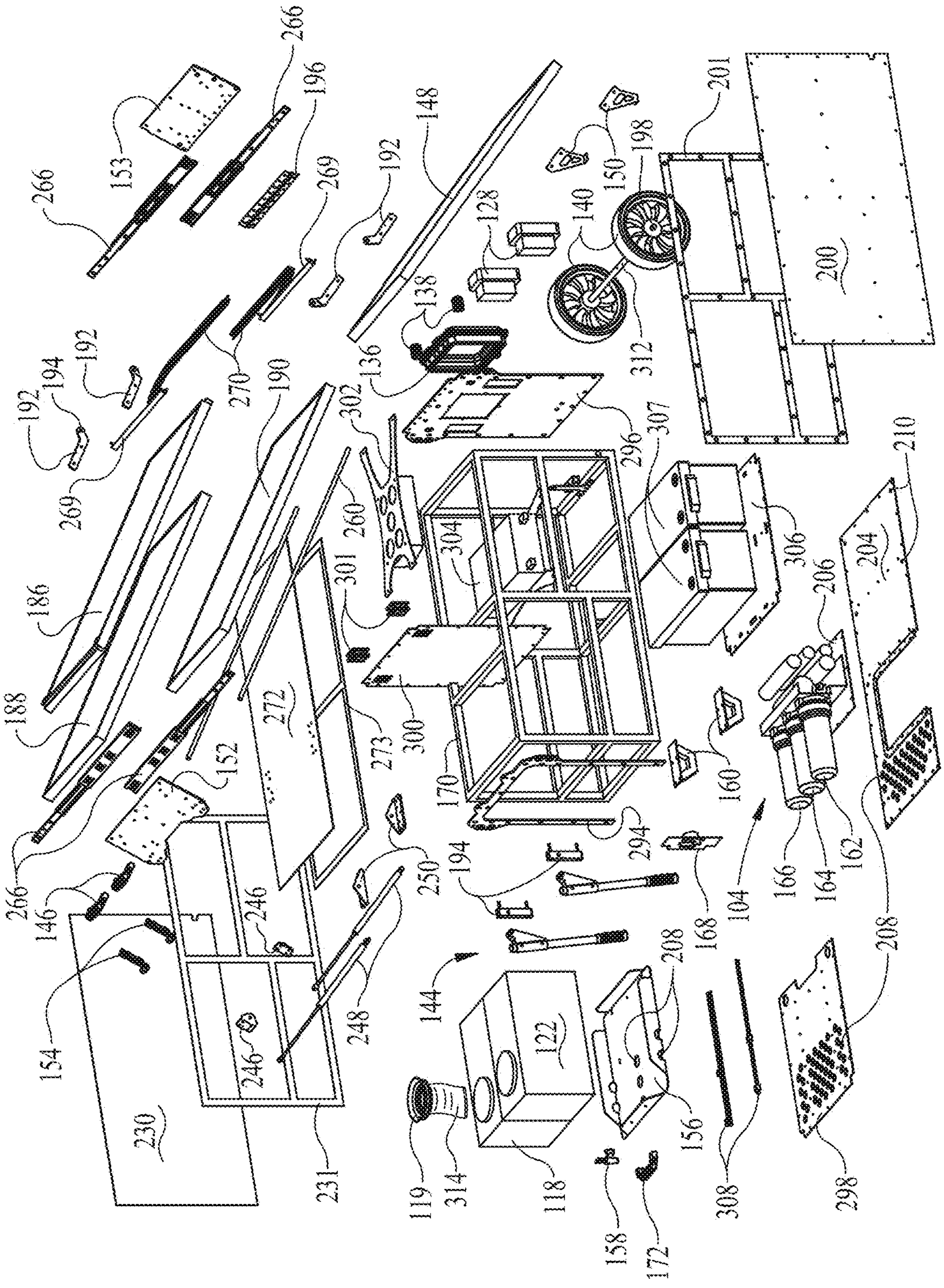
FIG. 22 is an exploded view of the main components of the DRD.

FIG. 22 is an exploded view of the DRD 100, showing all major components and subsystems in disassembled form to illustrate their structural and functional integration. The primary structure of the DRD includes the main housing 102, reinforced by the chassis framework 170. The front main housing plate 294, rear main housing plate 296, bottom panel 204, and upper housing assembly panel 272 enclose the system and sealed with gaskets 273. The upper assembly 108 houses multiple panels, including the fixed solar panel 186, left slide-out panel 188, right slide-out panel 190, and upper hinged panel 148. These pivot via the stainless steel piano hinge 196, hinge bearings 194, and gas shock assemblies 244 with upper 246 and lower 250 mounting brackets, stainless steel gas shocks 248, and reinforcing struts 260. The solar panel foot pads 150, front plate 152, rear plate 153, and rubber cushion pads 262 secure the panels in position. As explained above, deployment is guided by the extended linear slides 266, cable carriers 270, and cable carrier holders 268 and 269. The panels are secured in stowed position with the rubber hold-down latches 154.

Figure 23:
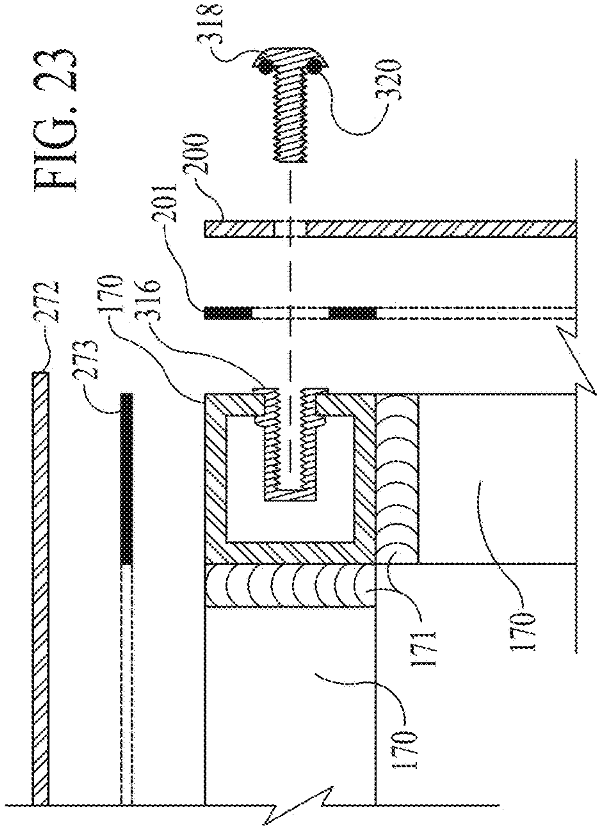
FIG. 23 is a sectional view of the weatherproofing system showing gaskets and exterior panels.

FIG. 23 is a sectional and exploded view of the DRD 100 highlighting the waterproofing system used to protect the housing and internal assemblies. The upper housing assembly panel 272 is secured to the chassis framework 170 by continuous acrylic VHB double-sided tape gasket 273 which is applied between the panel 272 and framework 170 to ensure an airtight and watertight seal. Additional weatherproofing is provided by an EPDM rubber gasket 201, which lines the interface of the right-side removable panel 200, preventing moisture ingress when the panel is secured.

Fastening strength and secondary water intrusion stoppage are achieved using closed-end rivet nuts 316 and non-ferrous machine screws 318, which work in combination with Buna rubber O-rings 320 under the screw heads to maintain the IP-rated seal. The TIG welds 171 on the chassis framework 170 further reinforce the structure, providing rigidity and long-term resistance against vibration or impact in field environments. FIG. 23 demonstrates how the DRD employs a multi-layered sealing system (273, 201, 320) integrated with structural reinforcements (170, 171, 316, 318) to achieve robust environmental protection. Unlike prior devices that rely on single-gasket or rota-molded plastic cases, the DRD combines industrial gaskets, O-ring sealing, welded framework, and riveted panels for a weatherproofing architecture that is both rugged and serviceable.

Figure 24:
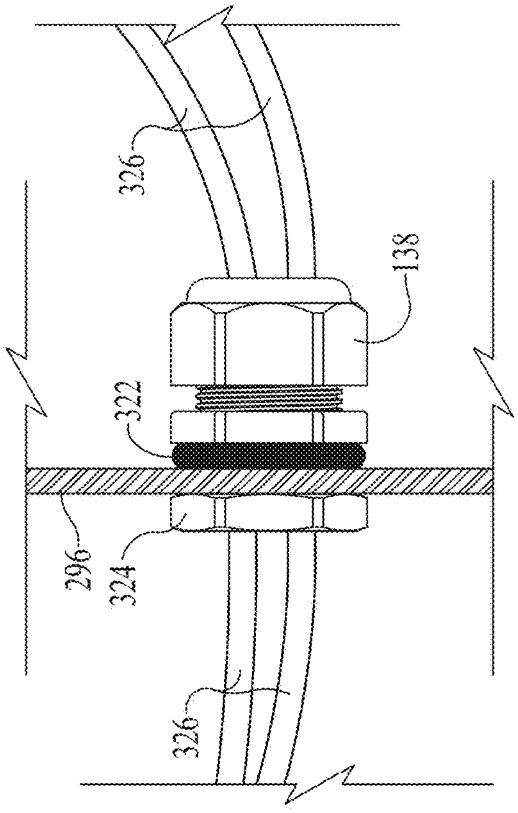
FIG. 24 is a sectional view of the weatherproofing system showing solar panel wiring into the main housing.

FIG. 24 is a sectional view of the DRD 100 showing the waterproofing system associated with solar panel wiring as it passes into the housing 102. The rear main housing plate 296 provides a sealed entry point for the electrical cabling. The shielded solar panel charging cables 326 are routed through the plate using a waterproof multi-cord grip 138, which maintains a watertight seal while allowing multiple cables to pass through. Each connection is further sealed with a large Buna rubber O-ring 322 to prevent water or dust ingress into the interior. A plastic nut 324 secures the fitting, maintaining compression of the sealing elements. The assembly ensures reliable electrical continuity and physical durability while maintaining environmental protection, even when the device is positioned on the ground 236 in thrusted rainfall, sandy, or otherwise harsh conditions. In contrast to conventional systems that rely on external junction boxes or exposed cable pass-throughs, the DRD 100 incorporates a redundant gasketed and O-ring-sealed assembly within its structural housing plate 296, ensuring both ruggedization and long-term maintainability.

Figure 25:
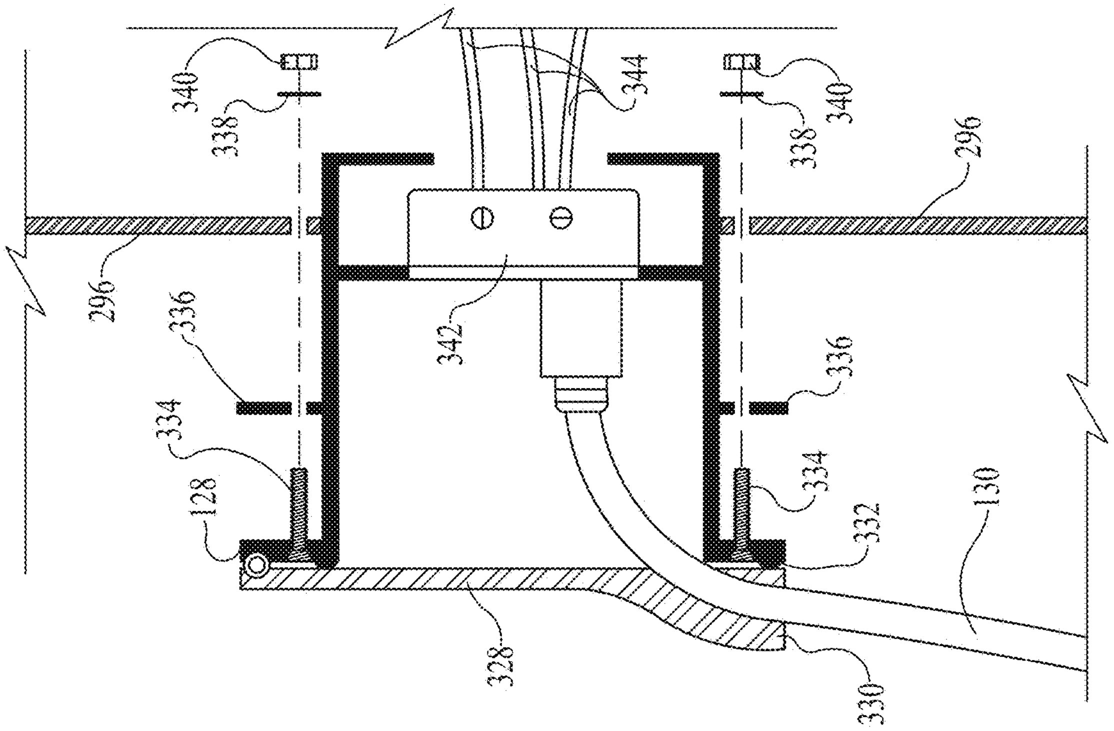
FIG. 25 is a sectional and exploded view of the weatherproofing system at an in-use outlet.

FIG. 25 is a sectional and exploded view of a portion of the DRD 100 showing the weatherproofing system for the in-use electrical outlet assembly. The outlets are mounted through the rear main housing plate 296, sealed against water intrusion with a rubber gasket 336 and secured in place by flat head machine screws 334, stainless steel washers 338, and nuts 340. The power interface includes the in-use electrical outlets 128, which are protected by a transparent hinged weatherproof outlet cover 328. The cover allows access for plugging in an extension cord 130 while maintaining environmental sealing. A dedicated opening 330 at the base of the cover permits cords to pass through without exposing the outlet assembly to rain or dust. Additional protection is achieved with a rubber seal and plastic rib 332, ensuring that the outlet remains sealed when the cover is closed. Electrical connectivity is provided through a 20 AMP corrosion-resistant GFCI receptacle 342, which is hardwired to the system using marine-grade Romex 12-gauge cable 344. This assembly ensures safe, weatherproof, and field-ready power distribution for critical loads. The DRD 100 uses a compact, gasketed, and in-use rated assembly directly mounted into the rear plate 296, ensuring rugged, continuous operation in disaster environments.

Figure 26:
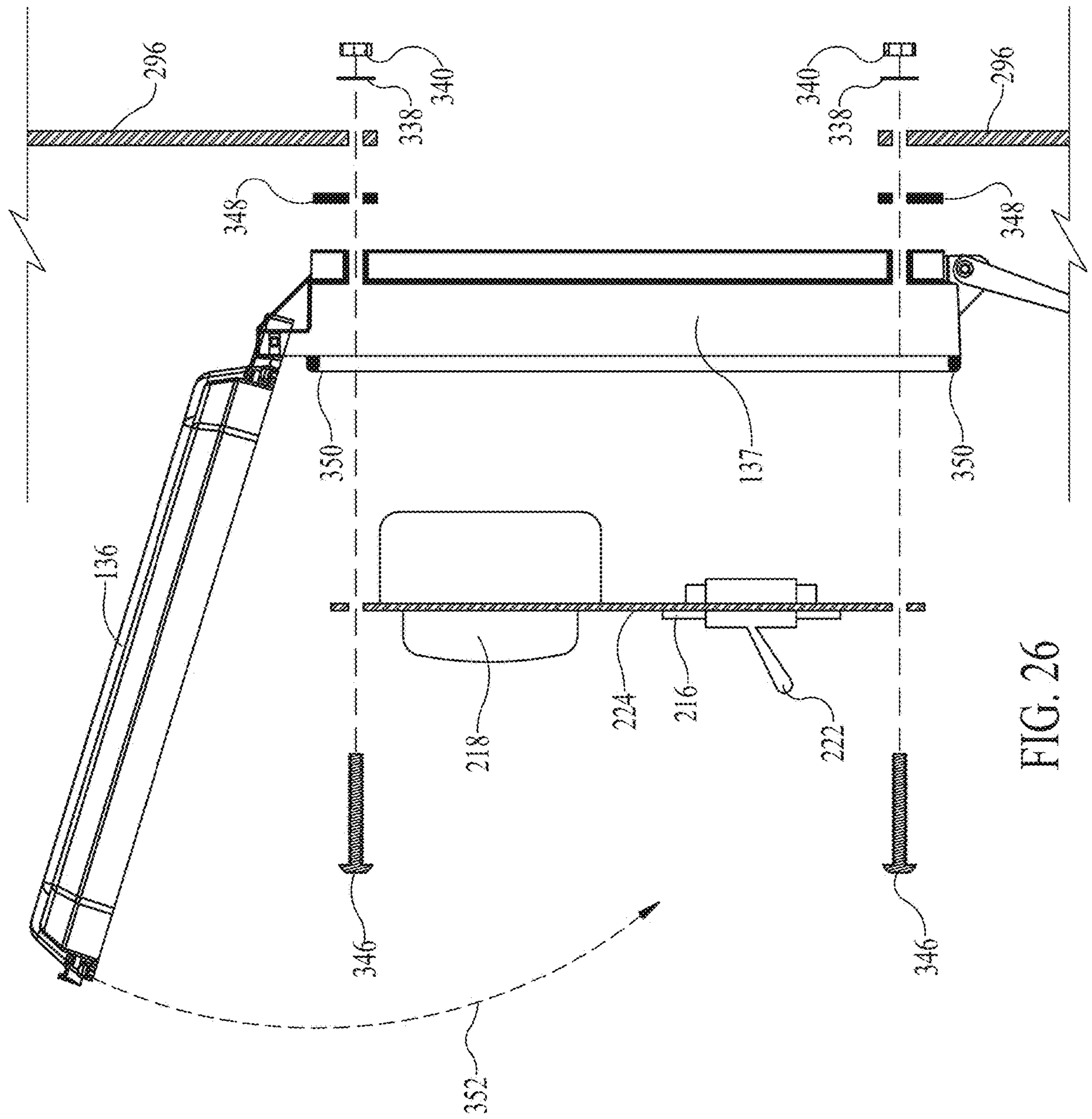
FIG. 26 is a sectional and exploded view of the weatherproofing system at the control panel enclosure.

FIG. 26 is a sectional and exploded view of the disaster relief device (DRD) 100 showing the weatherproofing system for the control panel enclosure. The control panel main plastic housing 137 is mounted to the rear main housing plate 296 and sealed by a combination of rubber gaskets 348, 350. The sealing surfaces are compressed using stainless steel button head machine screws 346, washers 338, and nuts 340, ensuring a watertight and dust-tight interface.

The operator interface is protected by a transparent UV-resistant hinged cover 136, which allows visual access to system indicators while shielding the components from rain and debris. The cover 136 operates through door opening/closing action 352, maintaining seal integrity when closed. Within the enclosure, the control panel mounting plate 224 supports key controls, including the main power on/off switch 218, the inverter on/off switch 216, and the UV sterilizer on/off switch 222. These controls are arranged for intuitive access while being fully protected by the gasketed enclosure. The DRD 100 incorporates a dual-gasket weatherproofing approach (348, 350) combined with a transparent hinged cover 136 for the control panel to uniquely provide immediate operational access with continuous environmental protection, ensuring both usability and durability in disaster conditions.

Figure 27:
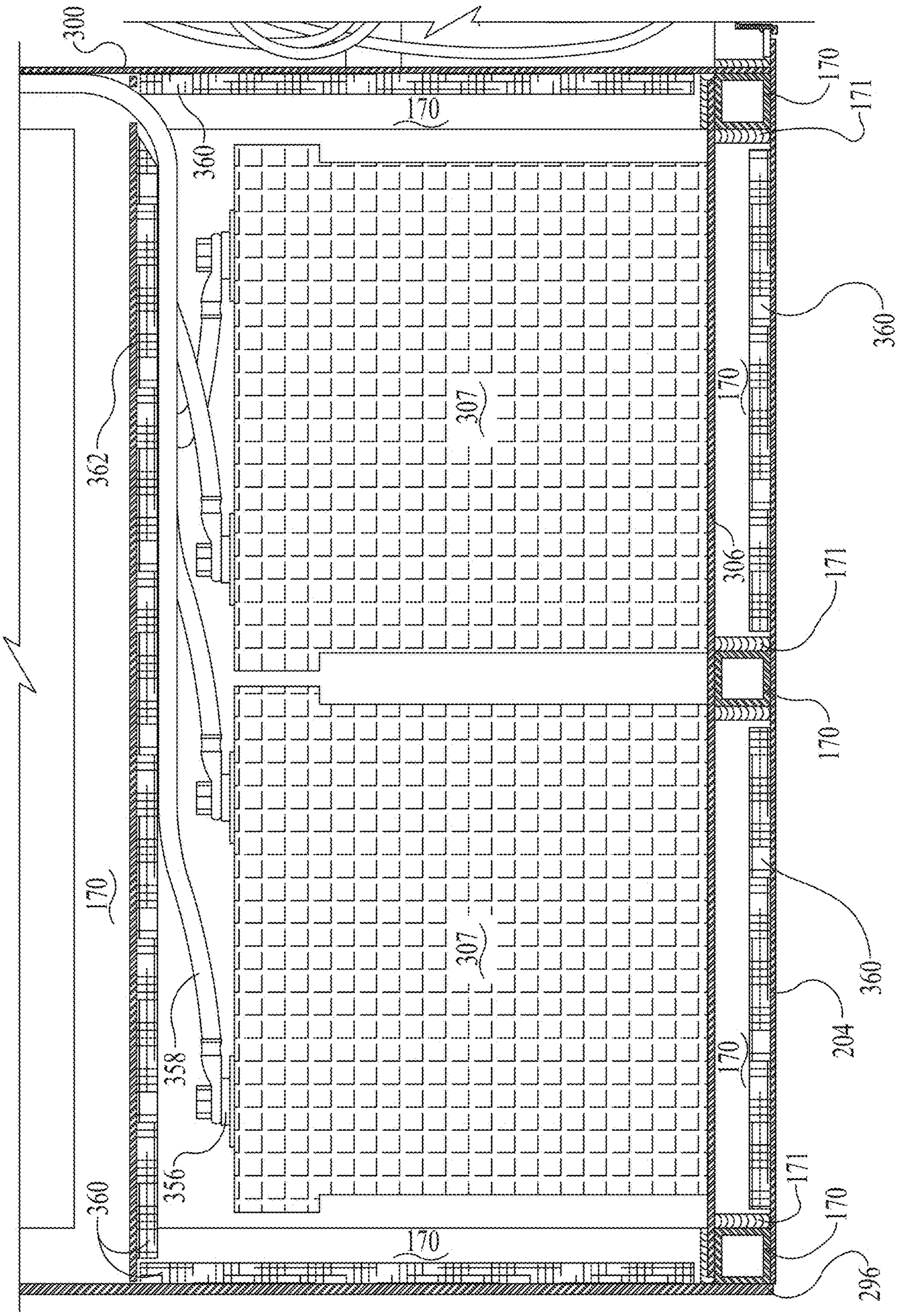
FIG. 27 is a sectional view of the fireproof battery enclosure.

FIG. 27 is a sectional view of the fireproof battery enclosure system. The chassis framework 170, reinforced by TIG welds 171, supports the structural housing of the battery compartment. The rear main housing plate 296 and the bottom panel 204 form part of the enclosure, which is further partitioned by an intermediate electronics and cooling/weatherproofing panel 300.

The batteries 307 are mounted within a battery tray panel 306 and enclosed by a battery fireproof box panel 362. Fire resistance and thermal isolation are provided by flame-resistant CPVC resin and glass mat thermoplastic sheets 360, which line multiple surfaces of the compartment. These layers work in combination with fire retardant blankets to create a triple-layer protective system. The electrical connections include battery terminals 356 and copper battery cables 358, routed safely through the enclosure while maintaining structural integrity and fireproofing. The DRD 100 incorporates layered flame-retardant CPVC and glass mat panels, reinforced battery trays, and dedicated fireproof box panels, providing superior thermal protection and compliance with transport and safety standards. This is a critical feature that is needed in the art to reduce the hazard level allowing the DRD units to be flown to disaster sites by immediate air transit.

Figure 28:
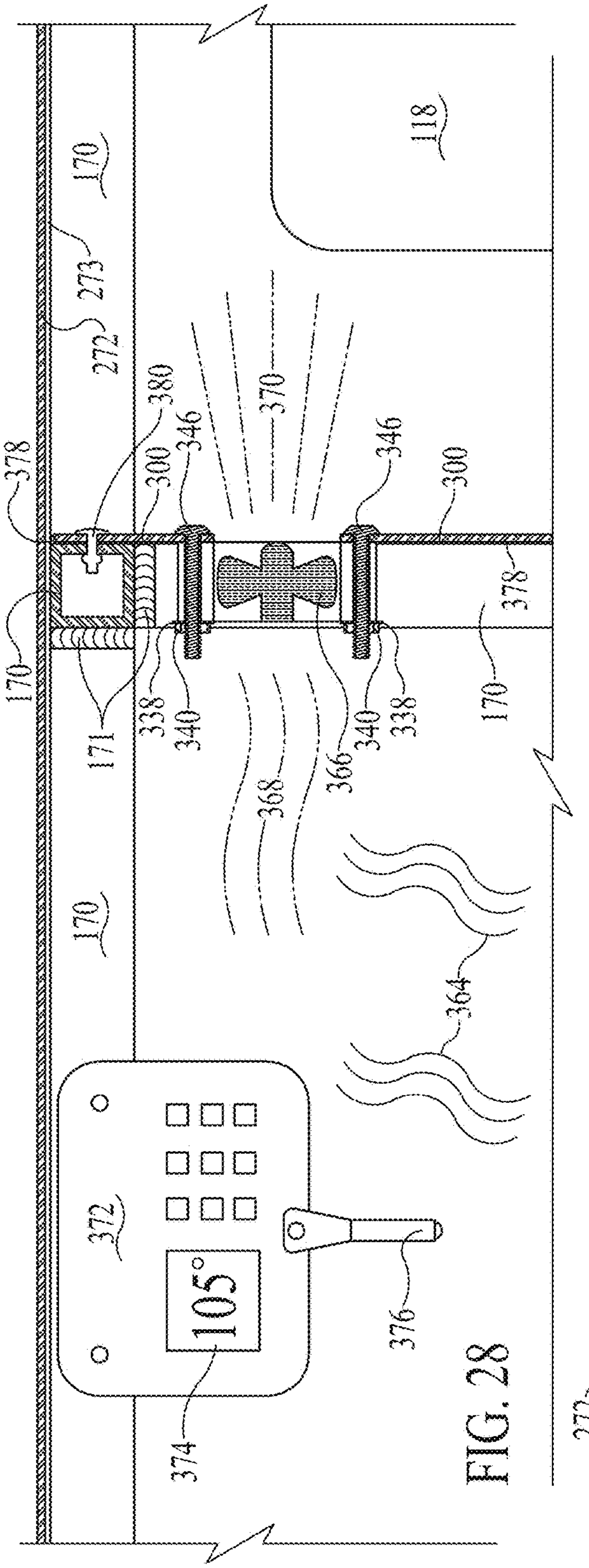
FIG. 28 is a sectional detail view of the thermostat control and exhaust portion of the cooling system.

FIG. 28 is a sectional detail view of a portion of the DRD 100 showing the thermostat control and exhaust cooling system integrated into the chassis. The chassis framework 170 provides the structural support for the cooling assembly. Multiple panels, including the intermediate electronics/cooling/weatherproofing panel 300 and upper housing assembly panel 272, are sealed with acrylic VHB double-sided tape gasket 273 and further protected by waterproofing sheets 378 to maintain compartment integrity. Thermal management is achieved through a programmable thermostat/temperature control 374, which is linked to a thermostat control system 372 and monitored by a temperature probe 376. These components regulate the activation of waterproof muffin fans 366, which circulate airflow 368 within the electronics housing. Air is exhausted outward through designated ventilation paths 370, maintaining stable operating conditions even under high external heat and humidity 364. Mechanical fastening and sealing are provided by stainless steel button head machine screws 346, washers 338, and nuts 340, while closed-end aluminum rivets 380 further reinforce the assembly. Positioned adjacent to this system is the dirty water storage tank 118, demonstrating the compact integration of power, cooling, and water filtration systems within the same rugged chassis without interference between compartments. Unlike conventional portable power units that rely solely on passive vents or exposed fans vulnerable to rain and dust, the DRD 100 uses sealed waterproof fans, automated thermostat control, and layered environmental protection, ensuring reliable electronics performance in extreme field conditions.

Figure 29:
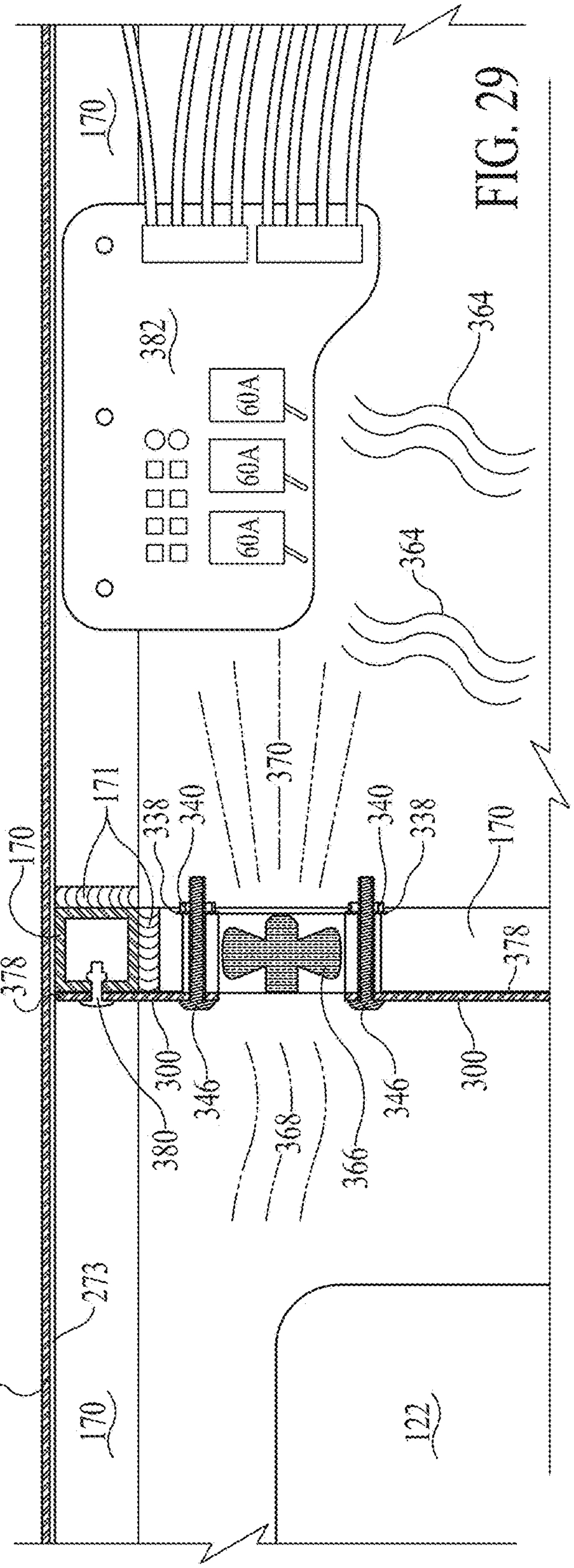
FIG. 29 is a sectional detail view of the intake portion of the cooling system.

FIG. 29 is a sectional detail view illustrating the intake portion of the cooling system. The chassis framework 170, assembled with closed-end aluminum rivets 380, provides the primary structural support. The upper housing assembly panel 272 and intermediate electronics/cooling/weatherproofing panel 300 are sealed with the acrylic VHB double-sided tape gasket 273 and reinforced with waterproofing sheets 378, creating a robust enclosure for environmental protection. Cooling airflow 368 is drawn into the compartment by waterproof muffin fans 366, which are mounted to the panel 300 using stainless steel button head machine screws 346. The airflow is then circulated across the electronics 382 and directed outward through designated exhaust pathways 370, ensuring efficient thermal management.

Fastening integrity is further ensured with washers 338 and nuts 340, which compress the sealing gaskets to maintain watertight and dust-tight performance. The system is engineered to resist high heat and humidity 364, maintaining safe operating conditions for sensitive components. Adjacent to the cooling system is the clean water storage tank 122, demonstrating the compact integration of filtration and electronics within the same ruggedized chassis while maintaining isolation between wet and dry compartments.

Figure 30:
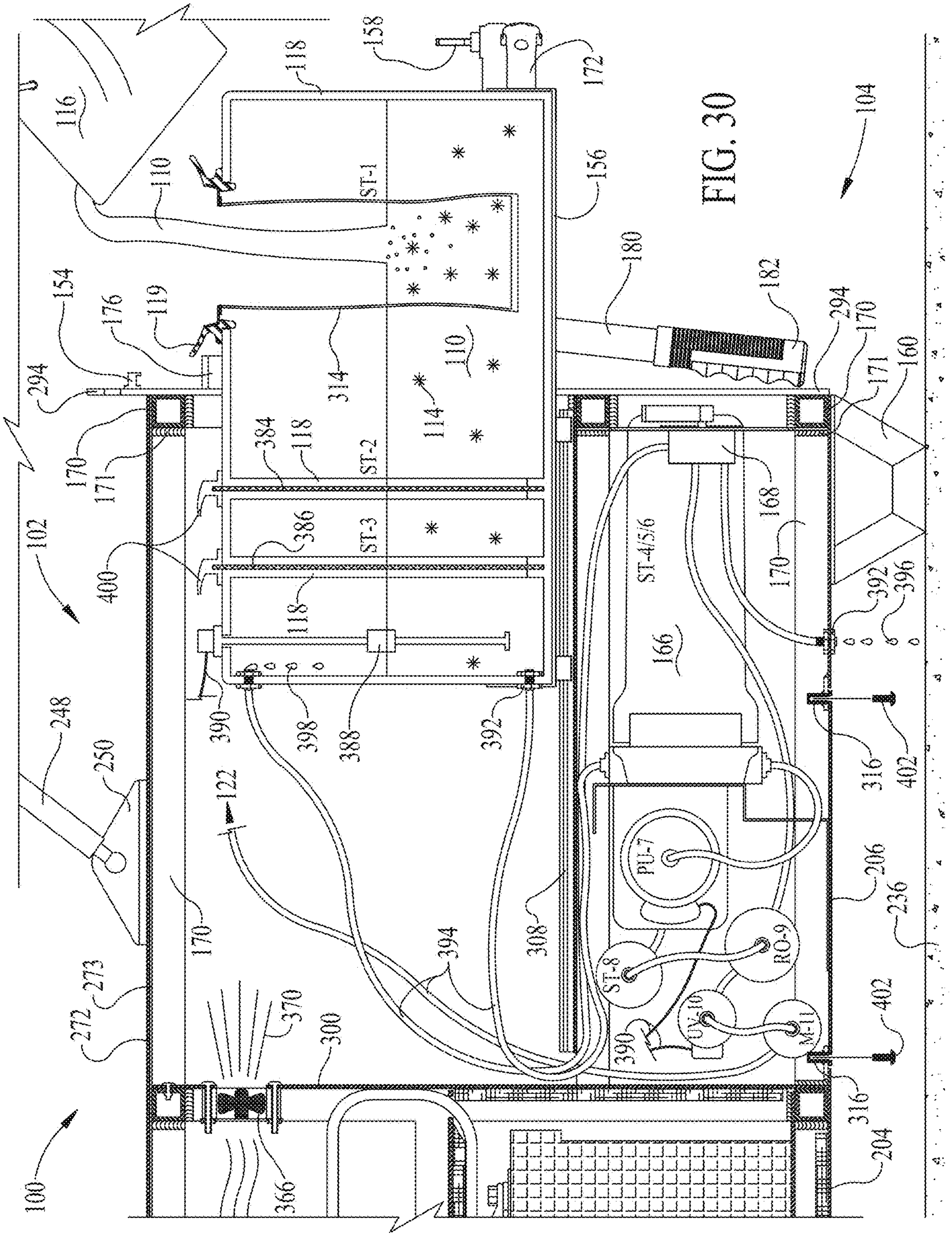
FIG. 30 is a sectional view of the water filtration process.

FIG. 30 is a sectional view showing the complete water filtration process and the integration of structural and functional elements. The chassis framework 170 supports the filtration system in combination with bottom panel 204, removable maintenance panel 206, and front housing plate 294. Contaminated water 110, containing pollutants, viruses, and bacteria 114, is collected into the dirty water storage tank 118 through the funnel ring filter sock holder 119, which holds a 25-micron washable polyester filter sock 314 to remove coarse particulates. Additional pre-filtration is achieved using sintered stainless mesh filters 384 (10 micron) and 386 (5 micron) before the water advances to finer purification stages. Referring still to FIG. 30, the filtration stages are schematically identified as ST-1, ST-2, ST-3, ST-4/5/6, PU-7, and ST-8, which collectively represent sequential pre-filtration and intermediate filtration stages including sediment filtration, particulate removal, and carbon filtration. These stages are followed by a reverse osmosis stage identified as RO-9, a UV sterilization stage identified as UV-10, and a remineralization stage identified as M-11. The designation of these stages is illustrative of a multi-stage filtration process and may vary depending on implementation, while still falling within the scope of the present invention.

The staged cartridge filters include the 3-5 micron sediment filter housing 166, which further removes smaller particulates. Flow regulation is managed by the emergency wastewater recirculation valve 168, connected to the bulkhead fittings with gaskets 392, HDPE water lines 394, and float switch wiring 390 linked to the electronic float switch 388. Waste brine water may be directed to ground 236 via outlet 396 or redirected into the dirty tank 118 through the wastewater recirculation system 398 during severe shortages.

Purified water is stored in the clean water storage tank 122 and accessed via the drawer handle 172 attached to the water storage tank drawer 156. Dispensing is controlled at the spigot 158. The system integrates seamlessly with the complete water filtration system 104 housed within the chassis. The DRD 100 unifies pre-filtration, fine filtration, storage, and emergency wastewater reuse in a single deployable unit, ensuring sustained potable water supply in disaster environments.

In one embodiment, the disaster relief device 100 further comprises an internal compartmentalization system configured to reduce the hazardous material classification level for air transport. This compartment is engineered to physically isolate and secure components such as the lithium iron phosphate battery pack and associated electrical interfaces within a sealed, thermally protected, and reinforced enclosure. The compartment may incorporate features such as pressure relief valves, flame-retardant lining, and vibration damping to meet transportation safety regulations established by the International Air Transport Association (IATA) and Department of Transportation (DOT). By segregating and securing these components, the device may be classified below certain hazardous goods thresholds, facilitating commercial or military air cargo approval without requiring special handling protocols.

In another aspect, the housing 102 of the device 100 is constructed to function as a Faraday cage, thereby providing electromagnetic shielding for the sensitive internal electronics. The structural panels of the housing are fabricated from conductive materials such as aluminum or stainless steel, and joined using electrically continuous seams, gaskets, and fasteners. The housing encloses and protects all key electronic components including the charge controller, battery management system (BMS), inverter, and control logic circuitry. This electromagnetic shielding renders the device resistant to electromagnetic pulses (EMPs), high-altitude nuclear events, and other directed energy threats. Such protection is essential for military, homeland security, and grid-down response scenarios, ensuring that the unit remains operational even under extreme conditions of electromagnetic interference.

As described above, the invention is a powerful and mobile disaster relief device that can be flown overnight transit to anywhere in the world. The current disaster relief equipment is too big and bulky (made to support massive basecamps). This equipment is massive and takes many weeks or months to arrive depending on the location. People need help immediately and cannot wait four weeks or more, they need help the next day. The compact all-in-one disaster relief device sustains life in the hard-to-reach areas moments after devastation strikes. The DRD can be flown in by air transit, plane, helicopter, drone, pickup truck, Jon boat, ground support etc. The DRD 100 is an all-in-one device made to sustain life for large groups of people as one unit can easily support a group of 75 people. This is not just a solar powered water filter, this is a powerful waterproof solar generator with an on-board water filtrations system made for contaminated surface water. The unit can filter 50+ gallons per day without using the battery storage, which allows first responders to use the power for medical equipment, communication, tools, refrigeration etc. The system is not only a powerful invention for disaster relief and recovery but an immediate solution to the world's global water crisis. Over 780 million people throughout the world do not have a safe drinking water source, with over 115 million drinking contaminated surface water. Since the DRD is designed to utilize nearby contaminated surface water, and is entirely waterproof, the device can make an immediate impact in solving a global crisis.

Figure 31:
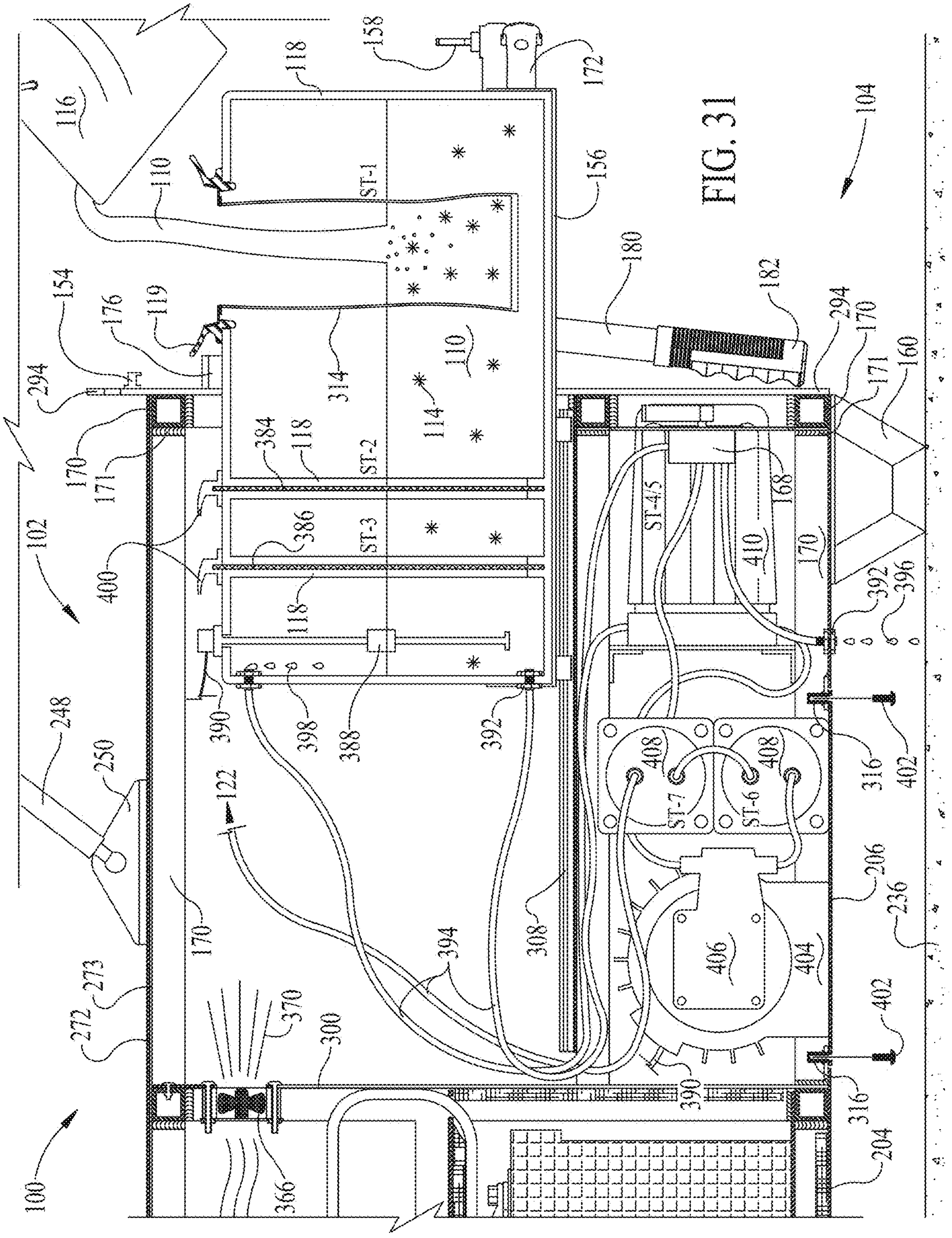
FIG. 31 is a section 1 view of an embodiment having a desalination system.

FIG. 31 is a sectional view of the disaster relief device (DRD) 100 illustrating the integrated desalination system, which enables the device to process saltwater or brackish water into potable water. The system is powered by a 120V AC motor 404 with a sealed aluminum housing that drives a hydraulic plunger pump 406. The pump is configured to generate high operating pressures in the range of 800 psi, suitable for reverse osmosis desalination.

Pressurized water is delivered to a high-pressure saltwater reverse osmosis (RO) membrane 408, which is housed within a reinforced aluminum end plate assembly secured with rods and nuts to withstand sustained high-pressure operation in corrosive marine environments. Ahead of the pump and membrane, a mini sediment stainless steel washable, reusable prefilter 410 is positioned to capture particulates and extend the service life of the membrane. The components illustrated in FIG. 31 include the motor (404), hydraulic plunger pump (406), reverse osmosis membrane (408), and prefilter (410), which collectively form the desalination system.

Accordingly, the DRD 100 has the ability to treat saltwater and brackish water (404, 406, 408, 410), a feature absent in conventional portable relief systems that are limited to freshwater sources. By incorporating a compact, high-pressure RO desalination system directly into the deployable housing, the DRD ensures reliable potable water production even in coastal, island, or floodplain disaster zones where saltwater contamination is prevalent.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A disaster relief device comprising:
a main housing;
a water filtration system disposed within the housing, the water filtration system including a sediment pre-filter, a multi-stage filtration system including a plurality of filtration stages and a reverse osmosis stage, and a UV sterilizer;
an electrical power system disposed within the housing, the electrical power system including a rechargeable battery pack, a charge controller, and an inverter;
a solar panel assembly mounted to the housing, the solar panel assembly including a hinged top solar panel and at least one slide-out solar panel movable between a stowed position and a deployed position; and
at least one outlet operatively connected to the inverter for powering external devices.

2. The device of claim 1, wherein the housing is sealed to at least an IP66 rating and configured to operate outdoors without auxiliary shelter.

3. The device of claim 1, wherein the housing is fabricated from conductive material and functions as a Faraday cage to shield the electrical power system from electromagnetic pulses.

4. The device of claim 1, wherein the solar panel assembly further comprises a cable carrier system configured to guide electrical wiring during deployment and retraction.

5. The device of claim 1, further comprising a clean water storage tank mounted in a drawer assembly, the drawer assembly being extendable on linear slides for field servicing.

6. The device of claim 1, wherein the water filtration system further comprises a valve configured to selectively discharge or recirculate wastewater from the reverse osmosis unit into a dirty water tank.

7. The device of claim 1, wherein the outlets are corrosion-resistant electrical receptacles mounted within an in-use waterproof box and hinged weatherproof transparent covers.

8. The device of claim 1, further comprising a folding handle assembly and airless wheels configured for single-operator transport across uneven terrain.

9. A disaster relief device comprising:
a main housing;
a water filtration system disposed within the housing, the water filtration system including:
a sediment pre-filter;
a multi-stage filtration system including a plurality of filtration stages and a reverse osmosis stage; and
a desalination system configured to process saltwater or brackish water into potable water;
an electrical power system disposed within the housing, the electrical power system including a rechargeable battery pack, a charge controller, and an inverter;
a solar panel assembly mounted to the housing, the solar panel assembly including a hinged top solar panel and at least one slide-out solar panel movable between a stowed position and a deployed position; and
at least one outlet operatively connected to the inverter for powering external devices.

10. The disaster relief device of claim 9, wherein the desalination system comprises an electric motor enclosed in an aluminum housing and configured to drive a hydraulic plunger pump.

11. The disaster relief device of claim 10, wherein the hydraulic plunger pump is configured to generate output pressures about 800 psi for saltwater reverse osmosis processing.

12. The disaster relief device of claim 11, further comprising a high-pressure saltwater reverse osmosis (RO)

membrane housed within a reinforced aluminum end plate assembly with rods and nuts to withstand sustained high-pressure operation.

13. The disaster relief device of claim 12, further comprising a mini sediment stainless steel washable and reusable prefilter positioned upstream of the RO membrane to capture particulates and extend membrane life.

14. The disaster relief device of claim 9, wherein the desalination system is integrated with the water filtration system such that the device is operable with freshwater, saltwater, or brackish water sources.

15. The disaster relief device of claim 14, wherein the desalination system is configured to automatically route brine output either to ground discharge or to a wastewater recirculation loop for conservation.

* * * * *